US011688029B2

(12) United States Patent
Fowler et al.

(10) Patent No.: US 11,688,029 B2
(45) Date of Patent: Jun. 27, 2023

(54) WAGERING PLATFORMS AND ACCESS DERIVED FROM MACHINE-READABLE CODES

(71) Applicant: Digital Seat Media, Inc., Fort Worth, TX (US)

(72) Inventors: Cameron Fowler, Fort Worth, TX (US); Matthew Sullivan, Austin, TX (US)

(73) Assignee: Digital Seat Media, Inc., Fort Worth, TX (US)

( * ) Notice: Subject to any disclaimer, the term of this patent is extended or adjusted under 35 U.S.C. 154(b) by 0 days.

(21) Appl. No.: 17/660,681

(22) Filed: Apr. 26, 2022

(65) Prior Publication Data

US 2022/0343451 A1    Oct. 27, 2022

Related U.S. Application Data

(60) Provisional application No. 63/201,373, filed on Apr. 27, 2021, provisional application No. 63/201,374, (Continued)

(51) Int. Cl.
*G06Q 50/34* (2012.01)
*G06Q 20/40* (2012.01)
(Continued)

(52) U.S. Cl.
CPC ......... *G06Q 50/34* (2013.01); *G06Q 20/1235* (2013.01); *G06Q 20/4014* (2013.01); (Continued)

(58) Field of Classification Search
CPC combination set(s) only.
See application file for complete search history.

(56) References Cited

U.S. PATENT DOCUMENTS 6,144,304 A  11/2000 Webb
6,658,348 B2  12/2003 Rudd et al.
(Continued)

FOREIGN PATENT DOCUMENTS

EP  2254083 A1  11/2010
EP  2988260 A1  2/2016
(Continued)

OTHER PUBLICATIONS

Daniel McLaren, Women's Beach Volleyballers sign deal to display QR code on their rears!, Aug. 9, 2011, DigitalSport, all pages, Retrieved from the Internet at https://digitalsport.co/women%E2%80%99s-beach-volleyballers-sign-deal-to-display-qr-code-on-their-rears (Year: 2011).*

(Continued)

*Primary Examiner* — Paul S Schwarzenberg
(74) *Attorney, Agent, or Firm* — Vos-IP, LLC

(57) ABSTRACT

A system for verifying a user device for authorizing access to a wagering portal comprising: a server system comprising at least one server, at least one database, and at least one user device; a plurality of operable rules populated on said server system wherein said operable rules are met by actions performed by scanning by the user device one or more tags positioned within a geofence within a venue; verifying an identification card or another verification data confirm age of the user; verifying a location by determining whether the scan by the user device of the first tag was within a geofence corresponding to the venue; and upon verifying the age and a location, redirecting from a server a URL or a Web app to the user device to a wagering portal.

9 Claims, 11 Drawing Sheets

Related U.S. Application Data filed on Apr. 27, 2021, provisional application No. 63/201,376, filed on Apr. 27, 2021, provisional application No. 63/269,015, filed on Mar. 8, 2022.

(51) Int. Cl.

| | | |
|---|---|---|
| *G06Q 20/12* | (2012.01) | |
| *G07F 17/32* | (2006.01) | |
| *H04N 21/218* | (2011.01) | |
| *H04N 21/258* | (2011.01) | |
| *H04N 21/414* | (2011.01) | |
| *H04N 21/437* | (2011.01) | |
| *H04N 21/472* | (2011.01) | |
| *H04N 21/482* | (2011.01) | |
| *H04N 21/81* | (2011.01) | |
| *H04N 21/8549* | (2011.01) | |
| *H04N 21/858* | (2011.01) | |

(52) U.S. Cl.
CPC ......... *G06Q 20/4015* (2020.05); *G07F 17/32* (2013.01); *H04N 21/21805* (2013.01); *H04N 21/25866* (2013.01); *H04N 21/41407* (2013.01); *H04N 21/437* (2013.01); *H04N 21/472* (2013.01); *H04N 21/482* (2013.01); *H04N 21/816* (2013.01); *H04N 21/8133* (2013.01); *H04N 21/8549* (2013.01); *H04N 21/8586* (2013.01)

(56) References Cited

U.S. PATENT DOCUMENTS

| | | | |
|---|---|---|---|
| 7,379,886 B1 | 5/2008 | Zaring et al. | |
| 7,587,214 B2 | 9/2009 | Inselberg | |
| 7,817,990 B2 | 10/2010 | Pamminger et al. | |
| 8,056,802 B2 | 11/2011 | Gressel et al. | |
| 8,494,838 B2 | 7/2013 | Donabedian et al. | |
| 8,731,583 B2 | 5/2014 | Wengrovitz | |
| 8,971,861 B2 | 3/2015 | Gupta et al. | |
| 9,002,727 B2 | 4/2015 | Horowitz et al. | |
| 9,117,231 B2 | 8/2015 | Rodgers et al. | |
| 9,201,470 B2 | 12/2015 | Kim et al. | |
| 9,223,750 B2 | 12/2015 | Liu et al. | |
| 9,223,885 B2 | 12/2015 | Marsico | |
| 9,324,079 B2 | 4/2016 | Moulin et al. | |
| 9,405,844 B2 | 8/2016 | Lim et al. | |
| 9,451,389 B2 | 9/2016 | Beg et al. | |
| 9,681,302 B2 | 6/2017 | Robinton et al. | |
| 9,767,645 B1 | 9/2017 | Cronin et al. | |
| 9,826,049 B2 | 11/2017 | Lim et al. | |
| 9,870,585 B2 | 1/2018 | Cronin et al. | |
| 9,883,344 B2 | 1/2018 | Bolton et al. | |
| 9,965,819 B1 | 5/2018 | Devries | |
| 9,977,865 B1 | 5/2018 | Laborde | |
| 10,009,429 B2 | 6/2018 | Manchado | |
| 10,127,746 B2 * | 11/2018 | Bergdale | G07C 9/28 |
| 10,163,124 B2 | 12/2018 | Horowitz et al. | |
| 10,178,166 B2 | 1/2019 | Sharan | |
| 10,248,905 B1 | 4/2019 | Beatty | |
| 10,942,913 B1 | 3/2021 | Khoyilar et al. | |
| 11,074,543 B1 | 7/2021 | Rudeegraap et al. | |
| 11,461,425 B2 | 10/2022 | Fowler et al. | |
| 11,468,138 B2 | 10/2022 | Fowler et al. | |
| 2001/0050310 A1 | 12/2001 | Rathus et al. | |
| 2002/0016816 A1 | 2/2002 | Rhoads | |
| 2003/0008661 A1 | 1/2003 | Joyce et al. | |
| 2003/0041155 A1 | 2/2003 | Nelson et al. | |
| 2006/0077253 A1 | 4/2006 | Vanriper et al. | |
| 2006/0094409 A1 | 5/2006 | Inselberg | |
| 2007/0229217 A1 | 10/2007 | Chen et al. | |
| 2009/0085724 A1 | 4/2009 | Naressi et al. | |
| 2009/0138920 A1 | 5/2009 | Anandpura et al. | |
| 2009/0189982 A1 | 7/2009 | Tawiah | |
| 2010/0077429 A1 | 3/2010 | Kim et al. | |
| 2010/0184462 A1 | 7/2010 | Lapstun et al. | |
| 2010/0228577 A1 | 9/2010 | Cunningham et al. | |
| 2010/0245083 A1 | 9/2010 | Lewis | |
| 2010/0279710 A1 | 11/2010 | Dicke et al. | |
| 2011/0034252 A1 | 2/2011 | Morrison et al. | |
| 2012/0011015 A1 | 1/2012 | Singh et al. | |
| 2012/0130770 A1 | 5/2012 | Heffernan | |
| 2012/0233237 A1 | 9/2012 | Roa et al. | |
| 2012/0280784 A1 | 11/2012 | Gaviria Velez et al. | |
| 2013/0073366 A1 | 3/2013 | Heath | |
| 2013/0080218 A1 | 3/2013 | Wildern, IV et al. | |
| 2013/0085834 A1 | 4/2013 | Witherspoon, Jr. et al. | |
| 2013/0166384 A1 | 6/2013 | Das | |
| 2013/0218721 A1 | 8/2013 | Borhan et al. | |
| 2013/0275221 A1 | 10/2013 | Zeto, III et al. | |
| 2013/0297430 A1 | 11/2013 | Soergel | |
| 2013/0311214 A1 | 11/2013 | Marti et al. | |
| 2014/0039945 A1 | 2/2014 | Coady et al. | |
| 2014/0046802 A1 | 2/2014 | Hosein et al. | |
| 2014/0058886 A1 | 2/2014 | Gopalakrishnan et al. | |
| 2014/0156752 A1 | 6/2014 | Fetyko | |
| 2014/0278592 A1 | 9/2014 | Giampapa | |
| 2014/0279072 A1 | 9/2014 | Serino | |
| 2014/0282684 A1 | 9/2014 | Keen et al. | |
| 2014/0365574 A1 | 12/2014 | Franks et al. | |
| 2015/0012307 A1 * | 1/2015 | Moss | G06Q 10/02 705/5 |
| 2015/0067811 A1 | 3/2015 | Agnew et al. | |
| 2015/0073879 A1 | 3/2015 | Acosta-Cazaubon | |
| 2015/0081532 A1 * | 3/2015 | Lewis | G06Q 90/20 705/346 |
| 2015/0088658 A1 | 3/2015 | Iiduka et al. | |
| 2015/0112704 A1 | 4/2015 | Braun | |
| 2015/0120388 A1 | 4/2015 | Tan et al. | |
| 2015/0161684 A1 | 6/2015 | Raikula | |
| 2015/0279164 A1 | 10/2015 | Miller et al. | |
| 2015/0294392 A1 | 10/2015 | Sharon et al. | |
| 2015/0296347 A1 | 10/2015 | Roth et al. | |
| 2015/0304601 A1 | 10/2015 | Hicks et al. | |
| 2015/0348329 A1 | 12/2015 | Carre et al. | |
| 2015/0379791 A1 | 12/2015 | Russell et al. | |
| 2016/0086228 A1 | 3/2016 | Babb et al. | |
| 2016/0104041 A1 | 4/2016 | Bowers et al. | |
| 2016/0104347 A1 | 4/2016 | Yang | |
| 2016/0189287 A1 | 6/2016 | Van Meter | |
| 2016/0191821 A1 | 6/2016 | Dwarakanath et al. | |
| 2016/0217258 A1 | 7/2016 | Pitroda et al. | |
| 2016/0282619 A1 | 9/2016 | Oto et al. | |
| 2016/0307379 A1 | 10/2016 | Moore, Jr. et al. | |
| 2016/0335565 A1 | 11/2016 | Charriere et al. | |
| 2016/0381023 A1 | 12/2016 | Dulce et al. | |
| 2017/0039599 A1 | 2/2017 | Tunnell et al. | |
| 2017/0142460 A1 | 5/2017 | Yang et al. | |
| 2017/0250006 A1 * | 8/2017 | Ovalle | G07F 17/3227 |
| 2017/0308692 A1 | 10/2017 | Yano | |
| 2017/0330263 A1 | 11/2017 | Shaffer | |
| 2017/0337531 A1 | 11/2017 | Kohli | |
| 2018/0025402 A1 | 1/2018 | Morris | |
| 2018/0026954 A1 | 1/2018 | Toepke et al. | |
| 2018/0089775 A1 | 3/2018 | Frey et al. | |
| 2018/0276705 A1 * | 9/2018 | Jay | H04W 4/029 |
| 2018/0288394 A1 | 10/2018 | Aizawa | |
| 2018/0330327 A1 | 11/2018 | Hertenstein et al. | |
| 2018/0336286 A1 | 11/2018 | Shah | |
| 2018/0353999 A1 | 12/2018 | McGillicuddy et al. | |
| 2018/0376217 A1 | 12/2018 | Kahng et al. | |
| 2019/0098504 A1 | 3/2019 | Van Betsbrugge et al. | |
| 2019/0130450 A1 | 5/2019 | Lamont | |
| 2019/0220715 A1 | 7/2019 | Park et al. | |
| 2019/0385128 A1 | 12/2019 | Cummings | |
| 2020/0035019 A1 | 1/2020 | Cappello et al. | |
| 2020/0104601 A1 | 4/2020 | Karoui et al. | |
| 2020/0184547 A1 | 6/2020 | Andon et al. | |
| 2020/0213006 A1 | 7/2020 | Graham et al. | |
| 2020/0236278 A1 | 7/2020 | Yeung et al. | |
| 2020/0320911 A1 | 10/2020 | Bruce | |
| 2020/0327997 A1 | 10/2020 | Behrens et al. | |
| 2020/0413152 A1 | 12/2020 | Todorovic et al. | |
| 2021/0019564 A1 | 1/2021 | Zhou et al. | |

(56) References Cited

U.S. PATENT DOCUMENTS

| | | | |
|---|---|---|---|
| 2021/0019715 A1 | 1/2021 | Stier et al. | |
| 2021/0027402 A1 | 1/2021 | Davis et al. | |
| 2021/0065256 A1 | 3/2021 | Shontz | |
| 2021/0118085 A1 | 4/2021 | Bushnell et al. | |
| 2021/0247947 A1 | 8/2021 | Jaynes et al. | |
| 2021/0248338 A1 | 8/2021 | Spivack et al. | |
| 2021/0390509 A1 | 12/2021 | Fowler et al. | |
| 2022/0114228 A1 | 4/2022 | Fowler et al. | |
| 2022/0167021 A1 | 5/2022 | French et al. | |
| 2022/0172128 A1* | 6/2022 | Lore | G07C 9/28 |
| 2022/0188839 A1* | 6/2022 | Andon | H04W 12/35 |

FOREIGN PATENT DOCUMENTS

| | | |
|---|---|---|
| EP | 3550844 A1 | 10/2019 |
| FR | 3092195 A1 | 7/2020 |
| KR | 10-2015-0042885 A | 4/2015 |
| WO | WO/2006/011557 A1 | 2/2006 |
| WO | WO/2008/124168 A1 | 10/2008 |
| WO | WO/2013/120064 A1 | 8/2013 |
| WO | WO/2014/081584 A1 | 5/2014 |
| WO | WO/2014/112686 A1 | 7/2014 |
| WO | WO/2015/035055 A1 | 3/2015 |
| WO | WO/2016/041018 A1 | 3/2016 |
| WO | WO/2019/016602 A2 | 1/2019 |

OTHER PUBLICATIONS

Printing Tips, QR Codes: Here They Come, Ready or Not, May 2011, Precision Printing, Issue 1, vol. 1, all pages (Year: 2011).*

Jacob Unroth, OU's Sooner . . . , Sep. 10, 2020, The Oklahoman, all pages, Retrieved from the Internet at https://www.oklahoman.com/story/sports/columns/2020/09/10/sooner-schooner-will-run-field-football-gameday-traditions-remain-new-ways-feel-like-can-safely-that/60383091007/ (Year: 2020).*

International Search Report issued in International Application No. PCT/US2021/071461 dated Feb. 10, 2022.

International Search Report issued in International Application No. PCT/US2022/071913 dated Jun. 15, 2022.

International Search Report issued in International Application No. PCT/US2021/070471 dated Jun. 28, 2021.

Garg, "QR Codes in Sporting Goods Companies: Eight Use Cases Across the Industry", Scanova Blog, Dec. 11, 2019, https://scanova.io/blog/qr-codes-sporting-goods-companies/.

International Search Report issued in International Application No. PCT/US2022/071909 dated Aug. 3, 2022.

International Search Report issued in International Application No. PCT/US2022/071912 dated Jul. 6, 2022.

International Search Report issued in International Application No. PCT/US2022/071938 dated Jul. 6, 2022.

International Search Report issued in International Application No. PCT/US2022/071906 dated Jul. 7, 2022.

International Search Report issued in International Application No. PCT/US2022/071910 dated Jul. 7, 2022.

International Search Report issued in International Application No. PCT/US2022/071908 dated Aug. 8, 2022.

International Search Report issued in International Application No. PCT/US2022/071915 dated Jul. 8, 2022.

"Blockchain", Wikipedia, Sep. 27, 2019.

"URL Redirection", Wikipedia, Mar. 21, 2021.

"Web Template System", Wikipedia, Mar. 2, 2021.

* cited by examiner

WAGERING PLATFORMS AND ACCESS DERIVED FROM MACHINE-READABLE CODES

CROSS-REFERENCE TO RELATED APPLICATIONS

This application claims the benefit of U.S. Provisional Patent Application No. 63/201,373 filed on Apr. 27, 2021, and claims the benefit of U.S. Provisional Patent Application No. 63/201,374 filed on Apr. 27, 2021, and claims the benefit of U.S. Provisional Patent Application No. 63/201,376 filed on Apr. 27, 2021, and claims the benefit of U.S. Provisional Patent Application No. 63/269,015 filed on Mar. 8, 2022, with the United States Patent and Trademark Office, the contents of which are incorporated herein by reference in their entirety.

FIELD OF THE INVENTION

Wagering and gaming are major worldwide industries and detailed herein are methods and embodiments related to engaging with users, placing bets and access to wagering via a machine-readable code.

BACKGROUND OF THE INVENTION

Wagering, whether in person or via online applications, is a multibillion-dollar industry. Worldwide, wagering on sporting events occurs for a wide variety of sporting events, including but not limited to horse racing, dog racing, as well as human sporting events.

Entire industries are in place to manage and set lines for sporting events, as well as to ensure the authenticity of the bets placed and to ensure the integrity of the games being played. The background industries include numerous betters, whether as individuals or through syndicates, who are often referred to as "sharps" and who bet large sums on sporting events.

Betting lines set on sporting events are provided for two key factors. First, assuming a two-team event, the house seeks to have an equal amount of money at risk for each side to win. Here, in such a case, with equal dollars at risk on each side, the house cannot lose. This is especially true when the house applies or adds a "vig" or the cost to make the bet. Odds on a sporting event often are provided at a numerical value, for example −110 or +110. The wager of −110 means that you have to wager $110 dollars to win $100 dollars. Conversely, the +110 means that you bet $100 to win $110. These numbers can change, and sometimes change rapidly, as the house seeks to control where money is being wagered. Where all of the money is placed on one side of the game, the house is at risk if that team wins the bets, and thus the house is required to pay out winning tickets in larger numbers than the losing tickets. Thus, the cost per bet may be modified to entice betters to place more money on one team over another.

Similarly, a bet may be placed with a point spread, for example −3 or +3. In such an example, team A, with a −3 bet at −110, would have to give three points, and a wager of $110 to win $100. Thus, if team A wins by 7 points, Team A would win, and the bet would be a winner. Similarly, a +3 wager would give Team B, 3 points. Thus, even if team B loses, say by 1 point, the +3 wager would add 3 points to their total, making the bet a winner, even when the team loses. The variety of the points and the cost the wager is virtually unlimited.

Sports betting does not only wager on the outcome of the game or on the outcome of a season, which are long-term bets, but also on short-term or immediate bets. Sometimes, these are called prop bets, and other times they are called micro betting. The point of such bets is sometimes to place wagers on different aspects of the game (i.e., prop bets). In Micro betting, the bets are typically placed on outcomes that will occur in a matter of seconds, or literally on the next play to occur. These types of wagers allow for instantaneous and continuous wagering on as many or few details of a given game.

Wagering is typically done within a casino or in certain areas that legally allow for wagering in the United States. In other areas around the world, different rules apply, which may allow for more restrictive or less restrictive wagering options.

Applicant has provided a new a useful manner in which to generate user leads, i.e., future betters through engagement, generate wagering portals, generate wagering without the requirement of an application, and to provide value and benefit to customers and the house in seeking to generate wagers within sporting environments and other environments that provide for legal wagering.

SUMMARY OF THE INVENTION

In a preferred embodiment, a system for verifying a user device for authorizing access to a wagering portal comprising: (a) a server system comprising at least one server, at least one database, and at least one user device; (b) a plurality of operable rules populated on said server system wherein said operable rules are met by actions performed by scanning, by the user device, one or more tags positioned within a geofence within a venue; (c) defining at least a first rule wherein said user device verifies an age corresponding to a user managing said user device, wherein verification of age confirms verifying an identification card or another verification data confirming age of the user; (d) defining at least a second rule comprising verifying a location by determining whether scanning by the user device of a first tag was within a geofence corresponding to the venue; and (e) upon verifying the age and a location, redirecting from a server a URL or a Web app to the user device to a wagering portal.

In a further embodiment, the system further comprising at least a third rule wherein said user device confirms ownership of a ticket corresponding to the first tag, said first tag comprising a tag ID, defining a specific seat within the venue; wherein the user device confirms ownership by the system after receiving a scan of the first tag by the user device and sends a request to the user device to identify a unique identifying ticket code matching the tag ID. In a further embodiment, the system wherein the tag ID corresponds to a benefit within the wagering portal selected from the group consisting of: a marker, a reduction of a cost of a bet, an increase in a payout of a bet, a refund of a portion of losses, a free wagering play, a free food or beverage, a deposit bonus, a free deposit of funds into a wagering wallet, and combinations thereof. In a further embodiment, the system further comprising a rule defining generation of a wagering bonus upon an event-related occurrence, wherein the event-related occurrence is selected from the group consisting of: a point scored, a game related event, the start of a game, the finish of a game, an occurrence by a given player within a game, scanning by a predetermined number of users of at least one tag within the venue, scanning by a predetermined number of users of at least one tag within the venue wherein the predetermined number of users are active on the system at a given time point, scanning of at least two tags by the user device, the scanning of at least two tags wherein each of said two tags are positioned within a different geofence, purchase of an item through the system, placement of a wager on the system, and combinations thereof.

In a further embodiment, the system wherein the system comprises ownership of an NFT; wherein ownership of the NFT affords a benefit to the user owning the NFT, said benefit selected from the group consisting of: a marker, a reduction of a cost of a bet, an increase in a payout of a bet, a refund of a portion of losses, a free wagering play, a free food or beverage, a deposit bonus, a free deposit of funds into a wagering wallet, and combinations thereof.

In a preferred embodiment, a method for authorizing placing a wager within a venue comprising: (a) scanning, via a user device (14a), a tag (16a) comprising a machine-readable code (MRC) (17a); (b) verifying a unique ID (22a) on said user device (14a) or generating a unique ID (22a) if one is not present; (c) verifying an identity and age of a user corresponding to said user device and said unique ID; and (d) directing the user device (14a) to a target URL defining a wagering platform.

In a further embodiment, the method wherein the tag (16) comprises a unique tag ID that identifies a seat within a venue. In a further embodiment, the method further comprising a verification step selected from the group consisting of: verifying ownership of a ticket corresponding to the tag (16), a time verification, a geolocation verification, a predetermined threshold defined by an administrator, and combinations thereof.

In a further embodiment, the method further comprising a verification step wherein upon scanning in step (a) of the tag (16a), a server confirms the presence of a unique identifying ticket code corresponding to ownership of a ticket corresponding to the unique tag ID. In a further embodiment, the method wherein the verification step comprises wherein a server performs an API call to a third party to obtain a digital record confirming ownership of a ticket matching seat information for said tag ID, wherein the digital record is selected from the group consisting of: a digital ticket, a phone number, a credit card, an address, a name, a birthday, another personally identifiable information, and combinations thereof. In a further embodiment, the method further comprising matching a unique tag ID with a physical ticket.

In a preferred embodiment, a method for placing a wager from a tag (16a) comprising: (a) scanning, via a user device (14a), a tag (16a) comprising a tag ID, said tag (16a) positioned on a seat and comprising a tag ID identifying said seat; (b) verifying a unique ID (22a) on said user device (14a), by requesting from a server a matching unique ID within a database, or generating a unique ID (22a) if one is not present; (c) verifying an identity and age of a user corresponding to the unique ID (22a); (d) verifying ownership of a ticket on said user device (14a), said ticket matching the seat defined by said tag ID; (e) directing the user device (14a) to a target URL defining a wagering portal; (f) accessing, from a wallet, funds for placing a wager; and (g) using said funds for placing a wager.

In a further embodiment, the method further comprising a verification step selected from the group consisting of: a time verification, a geolocation verification, a predetermined threshold defined by an administrator, and combinations thereof.

In a further embodiment, the method wherein the step of verifying ownership of a ticket on said user device is performed wherein upon scanning in step (a) of the tag (16a), a server confirms the presence of a unique identifying ticket code corresponding to the seat and the tag ID.

In a further embodiment, the method wherein the step of verifying ownership of a ticket on said user device is performed by utilizing an API call to match a digital record on the user device (14a) to an authorization for the ticket at the given tag (16a), wherein the digital record is selected from the group consisting of: a digital ticket, a phone number, a credit card, an address, a name, a birthday, another personally identifiable information, and combinations thereof.

In a further embodiment, the method further comprising: (d2) determining that the user device (14a) is within a predetermined geofence.

In a further embodiment, the method further comprising: (d2) confirming the presence of a first scan of a tag corresponding to a tag ID and performing a second scan of the same tag on a different day than the first scan.

In a preferred embodiment, a method for providing a wagering benefit to a user within a wagering platform comprising: (a) performing a user scan by scanning, via a user device (14a), a tag (16a) comprising a tag ID; (b) verifying, via a server and a database, a record for a unique ID (22a) having a corresponding matching unique ID on said user device (14a) or generating a unique ID (22a) if one is not present; verifying an identity and age of a user corresponding to the unique ID; (d) verifying that a user device (14a) comprises ownership of a ticket corresponding to the tag ID; (e) determining that the tag (16a) is present at a venue, wherein an event is being held at the time of the user scan; (f) determining whether the tag (16a) is provided within a tag grouping, wherein the tag grouping provides a wagering benefit selected from the group consisting of: a marker, a reduction of a cost of a bet, an increase in a payout of a bet, a refund of a portion of losses, a free wagering play, a free food or beverage, a deposit bonus, a free deposit of funds into a wagering wallet, and combinations thereof; and (g) applying the wagering benefit to the unique ID on the wagering platform.

In a further embodiment, the method wherein the step of verifying ownership of a ticket on said user device is performed wherein upon scanning in step (a) of the tag (16a), a server confirms the presence of a unique identifying ticket code corresponding to a seat and the tag ID.

In a further embodiment, the method wherein the step of verifying ownership of a ticket on said user device is performed by utilizing an API call to match a digital record on the user device (14a) to an authorization for the ticket at the given tag (16a), wherein the digital record is selected from the group consisting of: a digital ticket, a phone number, a credit card, an address, a name, a birthday, another personally identifiable information, or combinations thereof.

In a further embodiment, the method wherein the tag is displayed on a jumbo screen, and wherein the first x number of users to scan the tag from the jumbo screen receive a free bet, wherein the tag on the jumbo screen does not require seat verification.

In a further embodiment, the method wherein the tag is grouped within a section that provides a free bet upon scanning the tag.

In a preferred embodiment, a method for verifying a right to place a wager on a wagering portal by scanning a machine-readable code comprising: (a) receiving a request from a user device for accessing the wagering portal, the request received in response to scanning the machine-readable code with the user device, the machine-readable code corresponding to a tag disposed on a surface at an event, said tag having a tag ID; (b) in response to receiving the request and based on the tag ID, determining if the tag that was scanned by the user device has a matching unique identifying ticket code within the user device confirming the right to that tag ID; (c) in response to a confirmation that the matching unique identifying ticket code exists, confirming a location within a geofence corresponding to the event; (d) confirming an identity and age of a user, said user having a profile corresponding to a unique ID stored on said user device; wherein confirming the identity or age of the user comprises confirming the age of the user with an identification card or other government identification card; and (e) based on the steps of determining, confirming a location, and confirming an identity and age of a user, redirecting the user device to the wagering portal.

In a preferred embodiment, a method for determining ownership of a seat for confirming a wagering benefit tied to said seat comprising: (a) scanning, via a user device (14a), a tag (16a) comprising a tag ID, said tag ID comprising seat information for said seat; (b) verifying a unique ID (22a) on said user device (14a) or generating a unique ID (22a) if one is not present; (c) performing a search to confirm a unique identifying ticket code providing ownership corresponding to the tag ID selected from the group consisting of: (i) directing the user device (14a) to a server to confirm the presence of a digital record providing ownership information corresponding to said tag ID by searching a digital wallet (24a) for the presence or absence of a unique identifying ticket code and comparing the unique identifying ticket code to the tag ID, and confirming ownership where said digital record and said tag ID confirm a matching record; (ii) searching a paper ticket for a record corresponding to said tag ID; and (iii) performing an API call to a provider of said paper ticket and confirming at least one piece of personally identifiable information selected from the group consisting of: name, date, birthdate, credit card number, address, phone number, other personally identifiable information, and combinations thereof; and (d) upon location of a record providing ownership, confirming the identity and age of a user corresponding to said unique ID; (e) determining the wagering benefit tied to the seat by determining a tag grouping for the tag ID; and (f) and authorizing access to a wagering portal, wherein the wagering benefit is defined within the wagering portal.

In a further embodiment, the method wherein confirmation of a seat provides a free bet to the user.

In a further embodiment, the method wherein the method further comprises determining whether a rule is met; wherein a rule defines whether a user receives a benefit within the wagering portal; wherein upon meeting the rule, a benefit is provided to the user. In a further embodiment, the method wherein the benefit is selected from the group consisting of: a free bet, a deposit bonus, an increased payout, a reduced cost, a refund on losses, and combinations thereof.

DETAILED DESCRIPTION OF THE INVENTION

Figure 1:
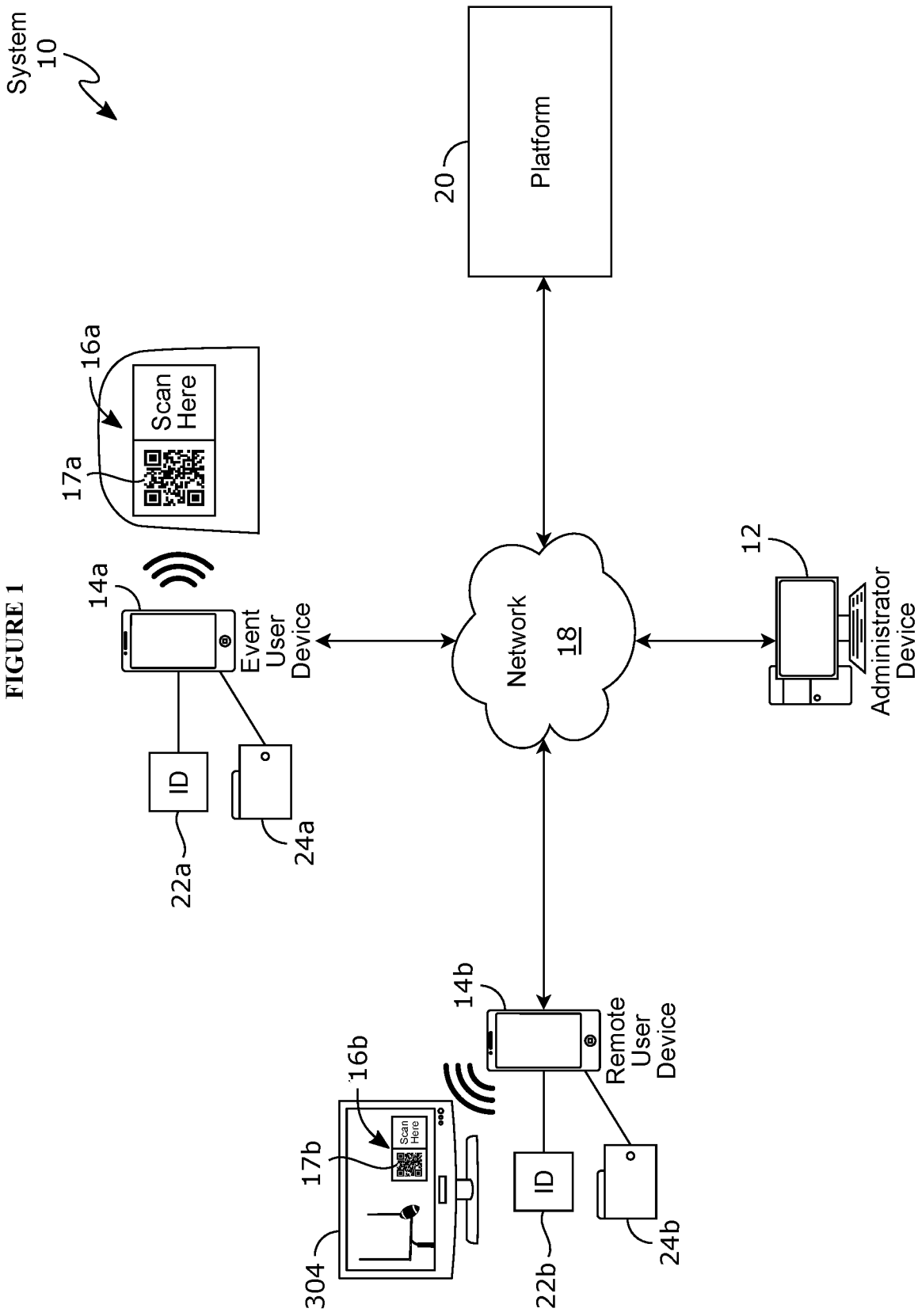
FIG. 1 depicts an embodiment of a system for user device generated interactions with a system and platform for accessing and viewing targets, such as a GUI for placing a wager.

Various embodiments are described more fully hereinafter with reference to the accompanying drawings, which form a part hereof, and which show, by way of illustration, specific exemplary embodiments by which the innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, devices, or any similar or equivalent arrangements known to those skilled in the art. Accordingly, the various embodiments may take the form of an entirely hardware embodiment, an entirely software embodiment or an embodiment combining software and hardware aspects. The following detailed description is, therefore, not to be taken in a limiting sense.

The embodiments provided herein are related to the ability to interact with a wagering platform based upon scanning of a tag. More particularly, the ability to interact with a wagering platform based upon scanning of a tag within a venue, wherein the venue is a sporting venue in which wagering is legal.

As used herein, the below terms will have the following meanings as may be supplemented elsewhere in this specification:

As used in this application, the words "a," "an," and "one" are defined to include one or more of the referenced items unless specifically stated otherwise. The terms "approximately" and "about" are defined to mean±10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

ADDRESS: Code used to direct a user device, browser, Web app, progressive Web app, administrator device, server, database, API, tool, software, etc., to a resource within the system or a network. Non-limiting examples of addresses include a uniform resource identifier (URI) or a uniform resource locator (URL).

ADMINISTRATOR: The individual or group of individuals with the ability to control and set rules and parameters within the system. This could be a third-party administrator, the proprietor, the venue, the owner of the tags, the team or performer participating in the event, a designated employee of any of the foregoing, etc.

ADMINISTRATOR DEVICE: Any type of mobile or non-mobile processing device such as a desktop computer, handheld computer (e.g., phone, smartphone, tablet, personal digital assistant), wearable computer (e.g., smart watch, smart glasses), portable computers (e.g., laptop, netbooks, Chromebook), or wearable or implantable device, and the like using wireless communication, a camera or other connectivity element that is accessible only to an administrator or proprietor or an employee designated by the administrator or proprietor.

ANALYTICS OR ANALYTICAL DATA: Data collected by the system or retrieved by the system via an API call to an external server or database. Non-limiting examples of analytical data include date, time, GPS location, personal identifying information, etc.

APPLICATION PROGRAMMING INTERFACE ("API"): An application programing interface or programming code that enables data transmission within the system, between the system's server and an external server or between one software product and another. Non-limiting examples of API connections to the system may be third-party vendor databases such as ticketing sales platforms, e-commerce sites such as merchandise sales, social media sites, or any other third-party software product that makes their API available for use by others.

API CALL—Computer code used by the system software to access data, server software or other applications within the system or external to the system, acting as an intermediary between any two devices or servers that want to connect with each other for a specified task. As used herein, API can mean (i) representational state transfer or Rest (RESTful) API; (ii) Simple Object Access Protocol ("SOAP") API; (iii) extensible markup language—Remote Procedure Calls ("XML-RPC"); (iv) JSON Remote Procedure Calls ("JSON-RPC), (v) open API; (vi) partner API; (viii) internal or private API; (ix) composite API; or (x) any other API that is generally known, or will be come to be known in the art. Thus, the system frequently uses an API, or sends an API request, to an internal or external program, server, or database to deliver requested information.

BLOCKCHAIN: Any digitally distributed, decentralized, public or private ledger that exists across a network such as those offered by the providers including but not limited to Ethereum, Binance Smart Chain, Polkadot, Flow by Dapper Labs, EOS, Tron, Tezos, WAX, Theta, etc.

BROWSER APPLICATION: An application that runs within the Web browser of a User Device or Computer. The instructions or executable code, typically written in a combination of HTML and JavaScript, is embedded within the Web page that is downloaded from a Web site.

CASINO: Any place offering a legal bet.

COMPUTER: May be any type of computer such as a laptop computer, desktop computer, tablet, and the like, and includes the appropriate hardware, firmware, and software to enable the computer to function as intended.

CONTENT: Any type of information, images, videos, etc. Non-limiting examples of content can be a video file, an image file, text, executable code, a digital offer, a digital coupon, a digital wallet offer, an AR, VR or mixed reality filter, a game, a poll, an app, an NFT, etc. Content can be specifically formatted for optimal viewing on a user device.

CRYPTO CURRENCY: Any digital currency in which transactions are verified and records maintained on a distributed ledger such as blockchain, for example, Bitcoin, Ethereum, Cardano, Binance Coin, Tether, Solana, XRP, Dogecoin, etc.

DATABASE MANAGEMENT SYSTEM: A software package designed to define, manipulate, retrieve, and manage data in a database, or any other generally accepted definition known to those skilled in the art.

DIGITAL OFFER: Any incentive or reward, for example an incentive to purchase at a discounted price or a free giveaway, offered by a proprietor and delivered to users from a server to a user device through a variety of channels. A Digital offer can be code stored in the user's digital wallet, an MRC displayed in Web browser and presented to a proprietor for redemption, an e-mail with a unique redemption code, a text message, SMS/MMS, push notification or socket notification with a unique redemption code. Digital offers can be stored anywhere on a user device or can be downloaded or turned into physical offers by printing. Digital offers can be limited to a particular user, or a user may share the digital offer to other users. If a digital offer is shared, the same offer can be shared to multiple other users, or the digital offer can be modified by the system when it is shared. Digital offers can also be associated with a unique code that is stored in a database on a server internal or external to the system.

DIGITAL WALLET: A software-based system that securely stores users' information such as payment information, passwords, digital certificates, digital coupons, crypto currency, tokens, NFTs, digital ID such as a digital driver's license or passport, etc. A digital wallet can be a blockchain or crypto currency wallet. A digital wallet can be stored locally on any user device or can be cloud based and accessed by a user device. Digital wallet can also mean digital storage in general on any user device or computer. Digital wallet can also be referred to as a mobile wallet.

DISTRIBUTED DATABASE SYSTEM: Any database that consists of two or more files located in different sites either on the same network or on entirely different networks.

DISTRIBUTED LEDGER: Any database that is consensually shared and synchronized across multiple sites, institutions, or geographies, accessible by multiple people.

DATA SERVER OR SERVER: Any form of electronic device or plurality of devices having at least one computer processor, e.g., a central processing unit (CPU), and some form of computer memory having a capability to store data, as is well known in the art. The server may comprise hardware, software, and firmware for receiving, storing, and/or processing data as described below. The hardware may be in a single unit, or operably connected via a network. For example, a computer or server may comprise any of a wide range of digital electronic devices, including, but not limited to, a server, a desktop computer, a laptop, a smart phone, a tablet, a smart watch, smart glasses, a wearable device or an implantable device or any form of electronic device capable of functioning as described herein.

DYNAMIC ELEMENT: An element that is updated, altered, customized, etc., in response to a change in the status of a metric, trigger, or any other datapoint as determined by the system. A non-limiting example of a dynamic element is the score of a game. If a goal is completed, then the score is updated to reflect this change.

EVENT: Non-limiting examples of an event include a professional, amateur or intermural sporting events (i.e., football, baseball, hockey, basketball, soccer, rugby or cricket game, tennis or golf match, track and field or figure skating event or automobile race), a theatrical performance (play, musical or opera), a musical concert, elementary school, middle school, high school, college or university event, a service or ceremony (i.e., religious or worship), a tradeshow or conference, guided or self-guided tours (museums, galleries and historical site), time spent in a venue such as a visit to a zoo or amusement park, etc.

FAN PORTAL: A GUI, such as a homepage, displayed in the browser of a user device that provides links or access to other pages/modules via buttons or other means of selecting options from a menu of choices. The fan portal can also be used for viewing content and receiving digital offers.

INTERFACE SERVER: Within the system, a program, executable code or API stored on a physical server, cloud storage system or in a serverless environment such as Amazon Web Services, which is capable of communicating with other servers, databases and APIs internal or external to the system. The interface server is able to make and receive calls, request and receive data, or execute other functions within systems. The interface server is also capable of running AI and/or utilizing machine learning.

GEOFENCE: A virtual perimeter for a real-world geographic area or an area in or around a venue.

GUI OR GRAPHICAL USER INTERFACE: A graphical interface to enable interactions between a user and the users device, such as but not limited to an interface to the Web app.

JUMBO SCREEN: Any display within a venue visible to users attending an event at a venue. The jumbo screen can be one display or multiple displays within the venue that can be controlled by the venue. Jumbo screen may also be known as a jumbotron.

LOCATION: An area whose perimeter or parameters are defined in an abstract way without boundaries that are clearly visible to users or proprietors. Non-limiting examples of a location include a town, city, state, country, region, continent, time zone, or geofenced area.

MACHINE-READABLE CODE ("MRC"): A barcode, a quick response (QR) code, near-field communication (NFC) code, radio-frequency identification (RFID) code, universal product code (UPC), machine readable graphics (e.g., having a pattern, matrix, or the like) coding, instructions coded on a chip, or combinations thereof. A MRC may be may be included into (i) a tag that is mounted to a surface, (ii) identification badges such as, for example, student identification badges, employment identification badges, concert badges, and the like, (iii) merchandise such as t-shirts, sweatshirts, hats, mugs, glasses, posters, CD's, and the like, (iv) a piece of paper, cardstock, or plastic that is handed to users, (v) a video stream viewed over the internet or network television channel, (vi) an LCD/LED/e ink display device embedded, attached or affixed to a surface.

MANIFEST: A file containing metadata for a group of accompanying files that are part of the system that instruct the user device how to handle the system when it is started.

MINTING: Uniquely publishing a token on the blockchain to make it purchasable, saleable, or tradeable.

NON-FUNGIBLE TOKEN ("NFT"): A non-interchangeable unit of data stored on a digital ledger, such as but not limited to blockchain, that can be purchased, sold, auctioned, and traded. As used herein, NFT includes the contract and subject matter associated with the NFT and can also mean semi-fungible token, fractional NFT. Non-limiting examples of the smart contracts that could govern a NFT include (i) 1/1 NFTs—known as ERC-721 tokens on Ethereum and Polygon, KIP17 on the Klatyn blockchain; (ii) Semi-fungible NFTs—known as ERC-1155 tokens on Ethereum and Polygon, KIP37 on Klatyn.

NFT MARKETPLACE: A platform where NFTs can be stored, displayed, bought, sold, traded, auctioned and in some cases minted.

PROPRIETOR: Any person or entity who purchases, subscribes to, or otherwise uses the system and/or platform and who is not a user. A Proprietor may or may not have administrative privileges to the system. Non-limiting examples of proprietors include, venue owners, event promotors, teams, performers, theatre troupes, religious organizations, educational institutions (i.e., elementary school, middle school, high school, college, university), restaurants, bars, retail establishments, amusement parks, museums, art galleries, advertisers, media outlets (i.e., network television, cable television, radio, internet broadcasts), hospitals and health care systems, ticketing platforms, airlines, ride share services, etc.

PROPRIETOR PORTAL: An access point for a proprietor to enter the system and/or platform typically displayed in a browser.

RECORD: Information that is stored in an electronic or other intangible medium without limitations on how the data is structured.

REDIRECT/IDENTIFICATION SERVER: The server within the system that makes a determination on if a user and/or user device that has entered the system is unique, by locating the manifest stored on a user device and if a manifest exists, associating the unique ID stored in the manifest on the user device with the database of known unique ID's stored on the redirect/identification server, or for confirming other data based on one or more requests to the redirect/identification server.

REDIRECT URL: An address generated by a server, such as the redirect/identification server or the interface server, in response to an incoming request that points the browser on a user device to a different target.

RESOURCE RECORD: A database record associated with a tag ID.

REQUEST: A message sent by one device to another (e.g., phone to server, server to server, computer to server, server to database, etc.) using an address to send the request. For example, upon selecting from the options available in the Web browser, the selection is coded into a request that the Web browser sends to the server via an address. The request typically provides instructions to the server. Non-limiting examples of a request can be—GET, POST, PUT, DELETE, CONNECT, OPTIONS.

RULE: A set of conditional statements that tells the system how to react to a particular situation. Rules can be preprogramed into the system or can be set or changed by an administrator or proprietor.

SYSTEM: The network, tags, platform, etc.

TAG: A physical (e.g., tangible) form, a digital (e.g., virtual/intangible) form, or may be combinations of both forms that contains an MRC. Physical versions of tags may be constructed from diverse types of materials. The MRC may be printed, etched, or fabricated onto the tag materials such as paper, glass, plastic, metal, fabric, and the like as a few nonlimiting examples. In the case of tags that contain MRC's that are NFC or RFID, the tags may be adhered to, attached to, embedded in, or fabricated on (or combinations thereof) a natural or manmade material such as metal (e.g., aluminum, stainless steel), wood, polymer (e.g., plastic), film, glass, and combinations thereof. The material may then be incorporated into or affixed (e.g., adhesive or other form of attachment) to an object or location. A tag may be printed on a single or multiple use badge or ticket. Digital tags may include LED/LCD screens or a designated location within a video stream in which the MRC is located.

TAG ID: A unique identifier for the MRC affixed to the tag. The unique identifier can be any combination of letters, numbers, and symbols. The tag ID is stored in a database on a server and is coded with information specific to the location of the tag. For example, the tag ID might generally identify the geographic location of the tag (i.e., the United States, Pennsylvania and/or Philadelphia), the general venue location of the tag (i.e., Fenway Park, Madison Square Garden, Carnegie Hall, The Natural History Museum), the specific location of the tag within the venue (i.e., Section A, Row 1, Seat 10, next to Van Gogh's "Starry Night"), or any combination of information.

TAG URL: A unique address assigned to the MRC on each tag that may optionally include the tag ID.

TARGET: A Web page, file, address, GUI, Web app, progressive Web app, portal, content, or digital offer delivered to a user device. Those skilled in the art may also refer to a target as an endpoint.

TARGET DETERMINATION PROCESS: The process described in FIG. 5.

TARGET ID: A unique identifier for the Target. The unique identifier can be any combination of letters, numbers and/or symbols that can be stored in a database, on a server, and/or both. The target ID allows the platform to distinguish one target from another.

TICKETING PLATFORM: Both the primary ticketing platform and the secondary ticketing platform.

TRIGGER: The magnitude or condition that must be reached for a certain result to materialize. Triggers can be determined either by the system, an administrator, or a proprietor. Non-limiting examples of a trigger can be the start or end of an event, something of significance that occurs during the event (i.e., the $10^{th}$ goal scored, the first encore by a musical act), a single user completing a certain task, or N-number of users completing a task.

TOKEN: A digital asset that is stored securely on the blockchain, representing a tradeable asset.

TOOLS: Cookies, pixels, widgets, plug-ins, etc.

UNIQUE ID: A unique identifier for the user device. The unique identifier can be any combination of letters, numbers and/or symbols, cookies, digital credentials, or it can be a digital certificate such as TLS, SSL, code signing certificate, client certificate, etc. . . . . The unique ID can be stored on the user device in any location on the user device such as the manifest, local storage, or digital wallet, in a database on a server, and/or both, and is used to associate the user device with the unique user record stored in a database on a server in the system.

UNIQUE IDENTIFYING INFORMATION: Personal information and demographics collected about a particular user's such as name, address, phone number, e-mail address, credit card information, gender, marital status, academic affiliation (student, faculty, alumni), driver's license number, age, username, password, pin number, social security number, bank account number, salary, etc.

USER DEVICE: Any type of mobile processing device such as a handheld computer (e.g., phone, smartphone, tablet, personal digital assistant), wearable computer (e.g., smart watch, smart glasses), portable computers (e.g., laptop, netbooks, Chromebook), or wearable or implantable device, and the like using wireless communication, a camera or other connectivity element.

VENUE: Any physical location with defined perimeters and parameters such as a stadium, arena, court, track, concert hall, theatre, course, museum, restaurant, place of worship (church, synagogue, temple, mosque, etc.), historical site, cultural site, amusement park, zoo, aquarium, conference center or any other place where events are held or users gather. Venues can also be hotel rooms, cruise ships, trains, airplanes, schools (elementary, middle, or high school) or a college campus or dorm.

WEB APP: Executable code that is stored on a remote server and delivered via the system or a network to a browser interface on a user device. The Web app may facilitate communication between the user device and one or more servers such as the redirect/identification server or the interface server.

Wagering on sports or on the outcome of any live event is as old as the events themselves. While wagering remains taboo in certain cultures, though it remains prevalent nonetheless, in many cultures, access to wagering is being expanded for any number of reasons. One reason remains that governments have recognized that illegal wagering became a cash opportunity for organized crime, and that its existence was not diminished due to its illegality. Thus, as legal sports wagering has become more prevalent, casinos and proprietors of gaming and wagering events seek new ways to identify customers, engage with bettors, and to provide new and seamless access to betting portals. The advent and modernization of telecommunication and mobile computing devices, such as smartphones and tablets, has further opened the doors to mobile wagering and wagering from a user's device, instead of at a betting kiosk or proprietor provided gaming devices.

Thus, embodiments herein are directed specifically to systems and methods for wagering. These systems and methods seek mechanisms to identify and validate legal users, provide geofencing and geographic elements in place to ensure compliance with laws, but to also provide new and unique wagering opportunities, benefits to users and to casino operators, and to engage with users of wagering systems. Furthermore, certain systems and methods are designed to provide new marketing opportunities to identify new players and to reduce the cost of client acquisition by providing new and useful platforms for seasoned and new bettors alike.

Accordingly, a high-level overview of an exemplary system (10) for wagering is shown in FIG. 1. The system (10) may include an administrator device (12), a platform (20), a user device (14*a*) associated with an event user (e.g., physically at the event/in the venue), a user device (14*b*) associated with a remote user (e.g., not necessarily at the event/in the venue), a plurality of tags (16a, 16b) and one or more networks (18). Generally, each user device (14a, 14b) may be used to scan, read, or otherwise detect (collectively "scan") machine-readable code ("MRC") (17a, 17b) associated with a respective tag (16a, 16b). The act of scanning a tag (16a, 16b)/MRC (17a, 17b) initiates communications between the user device (14a, 14b) that scanned the tag (16a, 16b) and the platform (20), which may result in the rendering of a Web page or the like (e.g., related to the event) by a Web browser and/or other application running on the user device (14a, 14b). Communications between user devices (14a, 14b) and platform (20) is typically via one or more networks (18), which may include, without limitation, the Internet, mobile networks, cloud-based platforms, or combinations thereof.

A proprietor may use a network of encoded tags (16a, 16b) to identify points of interest (e.g., locations, objects, people, etc.). The number of tags (16a, 16b) in the network and placement of tags on, in, or near points of interest is at the discretion of the proprietor to fit its particular assets and needs. Further, a proprietor may add to or subtract from the number of tags (16a, 16b) in the network at will. Thus, the number of tags (16a, 16b) in a proprietor's network may be dynamic, either more or less than an original network of tags. Each tag (16a, 16b) in the network of tags has a unique identifier (tag ID), which may be used to identify a particular point of interest. For example, a tag (16a, 16b) may be situated on or near a seat in a stadium, and the user who purchased a ticket to sit in that seat is the "limited owner" or renter of that seat for a particular event. In certain embodiments, it may be possible to have multiple copies of the same tag, each with the same tag ID, in locations where multiple scans would be desirable at the same time by multiple users. Thus, at the entrance to a stadium, a plurality of tags could be located at different entrance points, each having the same tag ID.

As is implied in FIG. 1, a certain number of tags (16a) may be present at the venue ("in-venue tag"), and additional one or more tags (16b) may be remote from the venue ("remote tag") where the MRC (17b) is displayed in/on a video transmission, signal, or the like, or on a Web page associated with the event, venue, and/or television network, as a few non-limiting examples. Of course, there is the possibility that a user at the event/in the venue scans the remote tag (16b) with his/her user device (14a). Each user device (14a, 14b) may also include, or may eventually include a unique identifier (22a, 22b) to uniquely identify the user device (14a, 14b) and a digital wallet (24a, 24b) to securely store a digital record containing sensitive information such as a driver's licenses, account information (e.g., banks, crypto currencies, credit cards), titles, tokens, tickets, vouchers, coupons, other digital file (301a, 301b), and the like. Such digital record containing sensitive information may be especially necessary when wagering often requires a certain age requirement for legal wagering, or for verifying seat ownership. The digital record may also be a record stored within a database on a server that contains the unique ID and unique identifying information associated with that unique ID for each user that accesses the system. The user/device record can contain an unlimited amount of information about the user device and presumably the user who owns the user device such as, but not limited to a history of events attended, digital offers used, gambling wagers made, NFTs minted or purchased, venues or locations visited, concession or merchandise purchases, donations made, incident reports, tags scanned, other actions taken, etc. This may further include certain information related to demographics, event attendance history, purchasing history) as well as information about the user device (type of device, GPS location of the device when is scans an MRC).

The proprietor may also access platform (20), albeit via the administrator device (12) and one or more networks (18). The administrative device may be located at the venue, or it may be at a location remote from the venue. Generally, the proprietor may access a proprietor portal (FIG. 3 at [322]) hosted by platform (20) to perform administrative and/or other activities such as determining what content (or other) will be sent to the user device (14a, 14b) in response to scanning a tag (16a, 16b).

In addition to hosting the proprietor portal, platform (20) may host a variety of other services including, without limitation, event user and remote user access to content associated with the event, venue, proprietor, and the like. As such, platform (20) may include, or may include access to, one or more servers, databases, application programming interfaces (APIs), artificial intelligence/machine learning algorithms, other algorithms, code, blockchains, blockchain platforms, geofences, third-party integrations, times stamp, and more, which is detailed below, with reference to accompanying figures.

Figure 2:
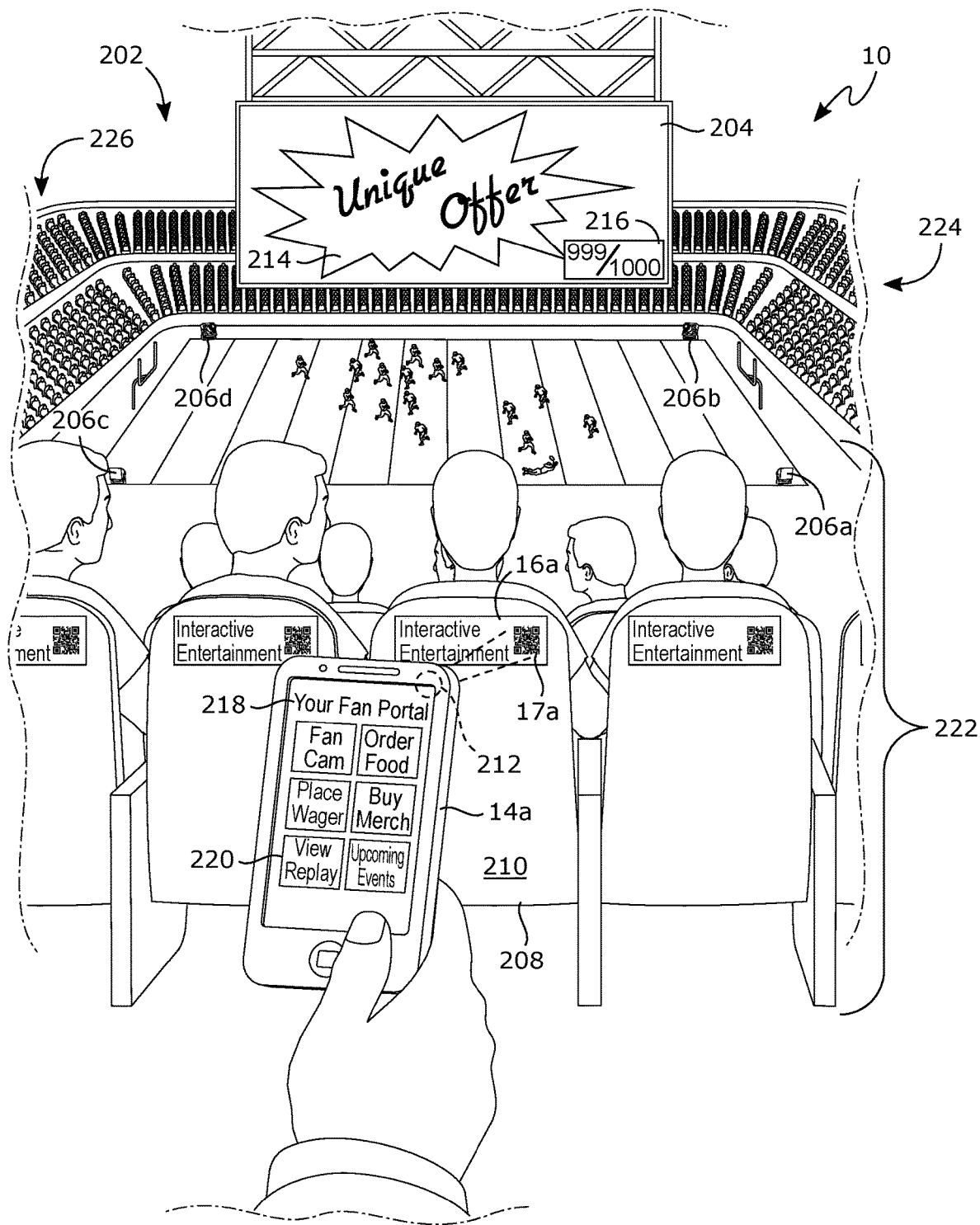
FIG. 2 depicts a stadium comprising a plurality of seats, rows, and sections and a user device that is accessing a user portal including an option for placing a wager.

FIG. 2 shows an exemplary venue (202), which includes a portion of system (10) shown in FIG. 1. In this case, the venue (202) is a football stadium including a jumbo screen (204), recording devices (206a, 206b 206c, 206d), seats (208), and a plurality of tags such as tag (16a). Although a stadium is shown, the venue (202) can be any venue: small, large, indoor, outdoor, permanent, temporary, one structure, several structures, an entire city, and variations thereof. Thus, a venue (202) can be any area or space occupied by or intended for something, and as such associated amenities and accoutrements may drastically vary from venue to venue. In this example, the stadium has jumbo screen (204), which may display a wide variety of video content as is customary for a football game, though such display screen is not necessary for functionality of the system. The stadium also includes optional recording devices (206a, 206b 206c, 206d) such as video cameras for recording the football game and other activity, which is also customary for this type of venue (202). Likewise, an event may be any event including sporting events, artistic performances, trade shows, conferences, ceremonies, services, self-guided tours (e.g., at museums, historic sites), and zoos as a few non-limiting examples. Notably, museums, historic sites, zoos, and similar examples may be both the venue and the event or house the event.

In the example of FIG. 2, each seat (208) has a seatback (210) with a tag (e.g., 16a) disposed thereon. In this way, event users can easily see a tag (e.g., 16a) directly in front of them while they are sitting in their seats (208). Thus, the tag (e.g., 16a) that the event user sees is associated with the seat (208) in which the user is sitting. Tag association with a particular seat (208) is desirable in embodiments that take advantage of knowing the event user's seat location such as for food or merchandise delivery directly to the seat (208), as non-limiting examples. In-venue tags (e.g., 16a), however, are not limited to being positioned on seatbacks (210); they may be placed in a wide variety of locations within a venue (202). For example, if in-venue tags (16a) are associated with particular seats (208), they may be placed in any other location on or near the associated seat (208) such as an arm rest, a cup holder, on the seat (208) next to the event user's leg, on the ground, or on a structure near the seat (208) such as a wall, a pillar, or the like. It should be noted that in-venue tags (16*a*) may be associated with other locations/ points of interest, and thus may be placed at or near the locations/points of interest such as entrances, levels, sections, isles, loge seats, individual people (e.g., with a tagged badge, tagged ticket, or the like), restrooms, various additional possibilities, or combinations thereof. Therefore, while one example of in-venue tag (16*a*) placement is illustrated in FIG. 2, in-venue tag (16*a*) placement should be broadly construed to include any placement suitable for use as described herein. Tags (16*a*) may be associated with one or more groupings, for example, by a section, (222, 224, or 226), wherein grouping of tags (16*a*) may provide certain benefits in the various embodiments detailed herein. Alternative placement schemes that may be devised by one skilled in the art, consistent with the teachings of the present invention, should be considered within the scope of the present disclosure.

As was mentioned with respect to FIG. 1, each tag (16*a*, 16*b*) in the system (10) has a machine-readable code (17*a*, 17*b*) associated therewith. The term machine-readable code ("MRC") as used herein should be broadly construed to include "graphics" type codes such as quick response (QR) codes, universal product code (UPC), snapcodes, and/or any other type of machine-readable graphics (e.g., having a pattern, matrix, or the like) coding known in the art or later developed. Importantly, as used herein, the term machine-readable code/MRC should also be construed to include "chip" technologies that store data on a chip such as, without limitation, near-field communication (NFC) and radio-frequency identification (RFID) technologies, as is known in the art or is later developed. Thus, MRC can be read, scanned, detected, or otherwise decoded (collectively, "scanned") by an appropriately enabled (e.g., camera, QR scanner, and/or NFC reader [212]) user device (14*a*, 14*b*).

In-venue tags (16*a*) may be physical (e.g., tangible), digital (e.g., virtual/intangible), or combinations of both forms. Physical tags may be constructed from diverse types of materials. In the case of tags having one or more graphical/matrix type codes such as QR codes, barcodes, and the like, the code may be printed, etched, fabricated, or the like on materials such as paper, glass, plastic, metal, fabric, and the like, as a few nonlimiting examples. In the case of NFC/RFID enabled tags, chips/antennae may be adhered to, attached to, embedded in, or fabricated on (or combinations thereof) a natural or manufactured material such as metal (e.g., aluminum, stainless steel), semiconductor, wood, polymer (e.g., plastic), film, glass, and combinations thereof, without limitation. The material may be incorporated into or affixed (e.g., adhesive, or other form of attachment) where desired. Digital tags may be displayed on a screen or communicated via radio waves. In the case of QR codes, barcodes, and the like, the graphical code may be displayed on a display screen such as the jumbo screen (204) or a display screen associated with the event user's seat (208), other locations/point of interest, or combinations thereof. Thus, the in-venue tag (16*a*) may be a video display, such as LCD, LED, e-ink, or other visual display and/or text accompanying the MRC (17*a*). In fact, most, if not all, remote tags (16*b*) will be a display screen such as on a television screen, computer screen, appliance screen, and the like, having the MRC (e.g., 17*b*) displayed thereon, or text on the display screen identifying the MRC (17*b*), although embodiments are not limited thereto.

Information encoded on or in each tag in the system (10) may include an address to direct a request (e.g., for a Web page) from the user device (14*a*, 14*b*) to a server or the like on the network (18) such as a server on platform (20). The address may be in the form of a uniform resource identifier (URI) such as a uniform resource locator (URL), according to a non-limiting embodiment. In this way, when the user scans the tag (16*a*, 16*b*) with the user device (14*a*, 14*b*), the user device (14*a*, 14*b*) sends a request to the appropriate network (18) location. In the example shown in FIG. 3, when the event user uses his/her user device (14*a*) to scan tag (16*a*), the event user device (14*a*) obtains an address from the MRC (17*a*) associated with the scanned tag (16*a*) and sends a request via the network (18) to the address destination. As one example, the address is a URL that causes the event user device (14*a*) to send a request to a redirect/identification server (302), on platform (20), which receives the request. Similarly, when the remote user uses his/her user device (14*b*) to scan the MRC (17*b*) on a screen (304), a similar URL is obtained which causes the request from the remote user device (14*b*) to be sent to the redirect/identification server (302), which receives the request.

In a typical embodiment, each tag (16*a*, 16*b*) in the plurality has a unique tag identification number (i.e., "tag ID"), which may be appended to the URI/URL, although embodiments are not so limited. The tag ID may be used by the platform (20) for several reasons, one of which is to identify a point of interest/location associated with the tag (14*a*, 14*b*) via a tag ID lookup. For example, when a request comes from the event user device (14*a*), the platform (20) knows that the request came from within the venue (202) and is associated with the seat (208) in which the event user is sitting. And when the request comes from the remote user device (14*b*), the platform (20) knows that the request is in response to scanning a tag (e.g., 16*b*/MRC 17*b*) in transmission, on a Web page, or the like, and the platform (20) knows which transmission/Web page is associated with the scanned tag (16*b*). In an embodiment, the tag ID may be appended to the URL (or URI) such as by one or more parameters, pattern matching techniques, or other such mechanism for encoding information in a URI, URL and/or browser request.

Figure 3:
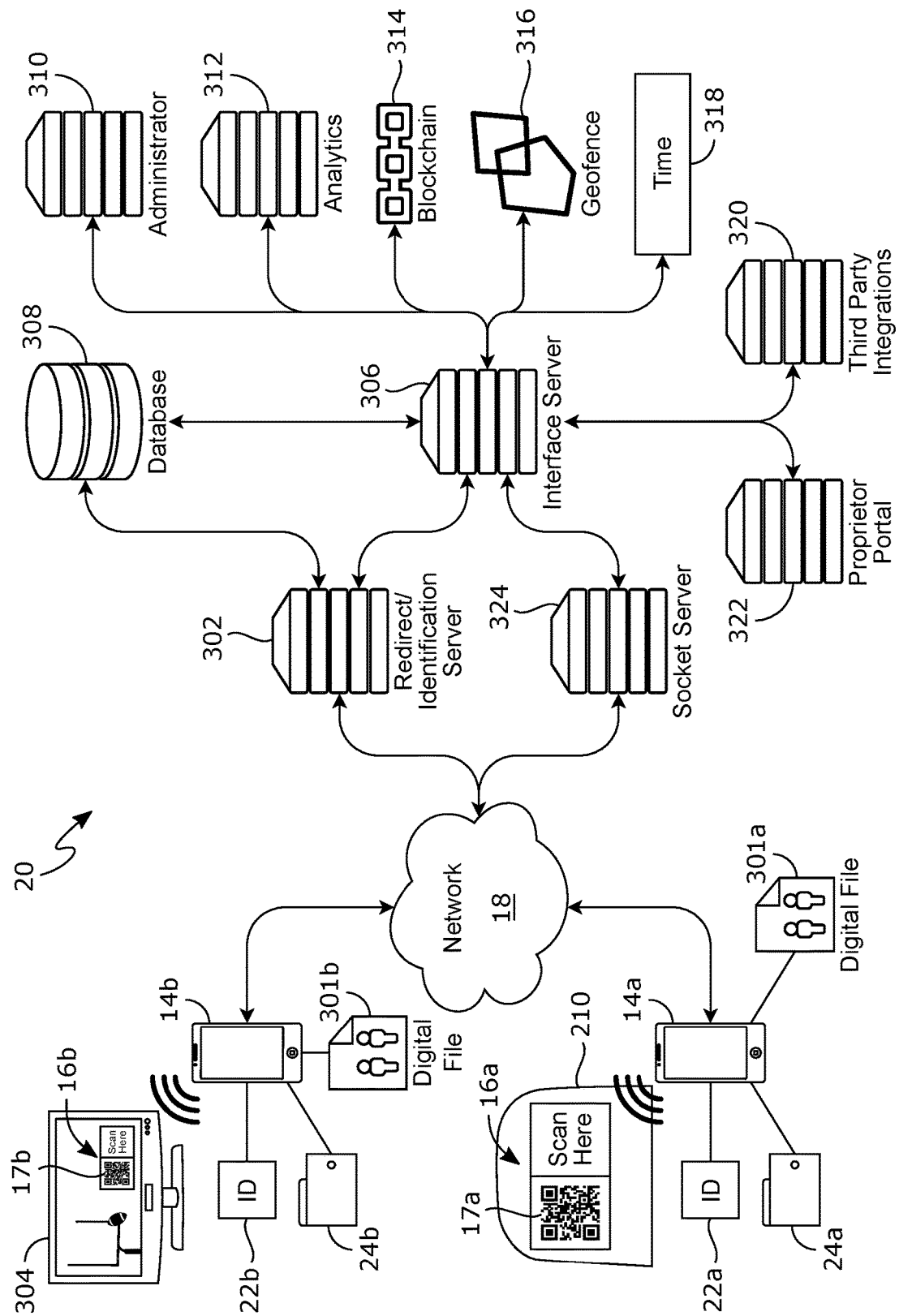
FIG. 3 depicts an embodiment of a system for accessing target information from a user device from within a venue or outside of a venue and various back-end platforms for implementing certain target information or for delivering content to the user device.

FIG. 3 details an exemplary infrastructure that may be used by platform (20) although infrastructures are not limited thereto. This infrastructure may include the redirect/identification server (302), an interface server (306), a database (308), an administration server (310), an analytics server (312), a blockchain, access to a blockchain, or both (314), a geofence (316) a timestamp (318), one or more third-party integrations (320), the proprietor portal (322), and a socket server (324). Generally, user device (14*a*, 14*b*) communicates with the platform (20) via redirect/identification server (302) as was previously described. Redirect/identification server (302), accept requests from user devices (14*a*, 14*b*), sends responses to user devices (14*a*, 14*b*), and performs various other methods as described herein. As one non-limiting example, the redirect/identification server (302) may forward information (e.g., URLs, parameters, etc.) from user device (14*a*, 14*b*) requests to the interface server (306). The interface server (306) manages most, if not all the tasks involved with processing requests, such as handing off/directing tasks, functions, calls, and the like where needed. The interface server (306) may also return request responses to the redirect/identification server (302). If a request came from a user device (14*a* or 14*b*), then the redirect/identification server (302) forwards the response to the requesting user device (14*a* or 14*b*). Examples of tasks, functions, calls, and the like that the interface server (306) may hand off include, without limitation, database (308)/blockchain storage, lookups, etc., administrative and back-end tasks/functions to the administration server (310), analytical tasks/functions to the analytics server (312), geolocation tasks/functions (316), time/timestamps (318), API calls to third-party servers for third-party integrations (320) and establishing socket connections via socket server (324).

Figure 4:
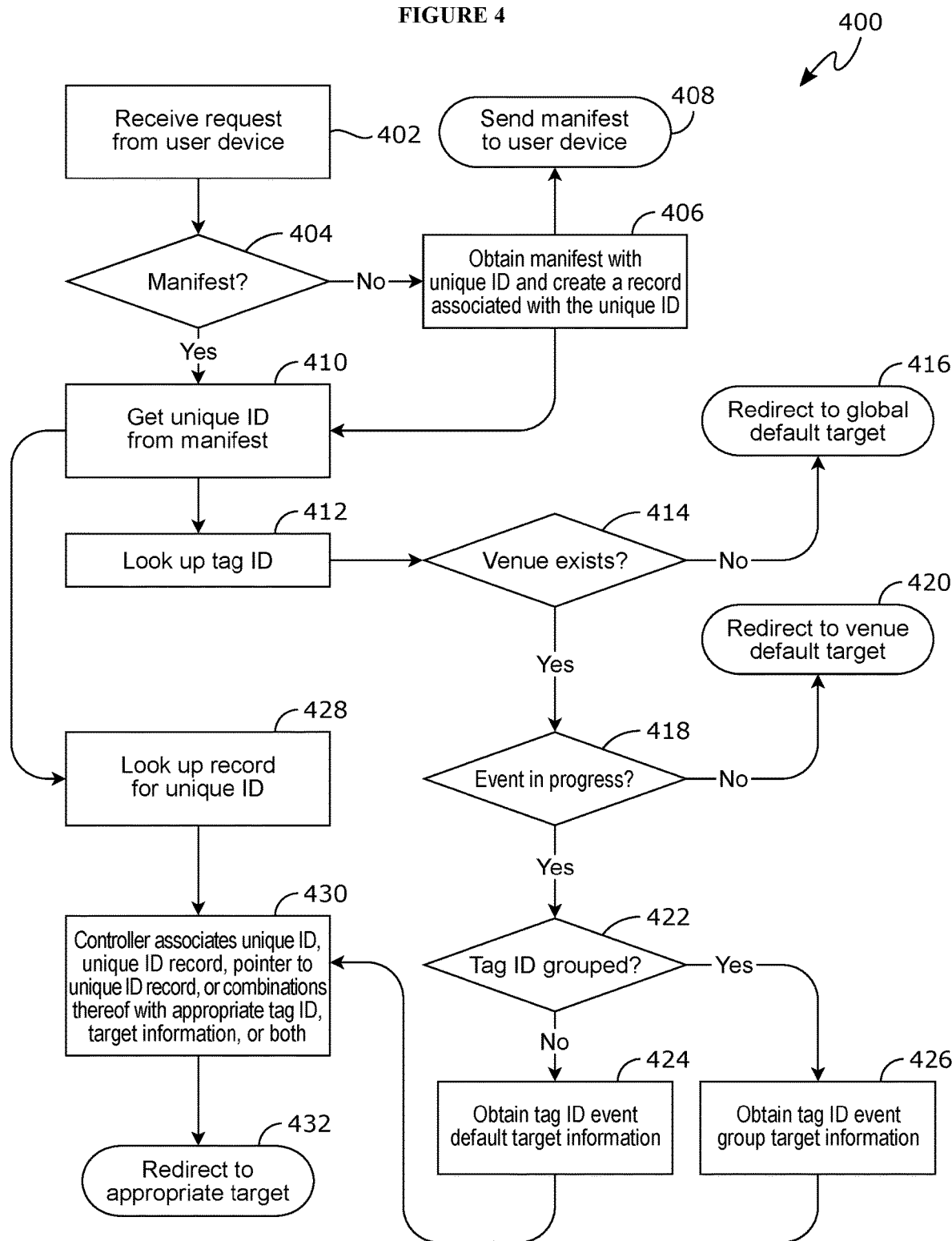
FIG. 4 depicts an embodiment of a system for identifying and using information particular to a user device and/or to a tag for directing the user device to an appropriate target.

Referring to FIGS. 3 and 4 together and using the request from event user device (16a) as an example, a method (400) may begin with the redirect/identification server (302) receiving the request (step 402) from the event user device (14a). From there, the redirect/identification server (302) may check to see if the event user device (14a) has a manifest (containing the unique ID, or just the unique ID alone) loaded thereon (step 404). If no, the redirect/identification server (302) may obtain a manifest and assign a unique ID (e.g., from database [308]) for the event user device (14a, step 406). The manifest includes a unique ID to identify the event user device (14a) with an identifier that is not shared with any other user device (e.g., 14b). The redirect/identification server (302) will also cause the unique ID for the event user device (14a) to be stored in a database such, as database (308), as is appropriate for the database management system (step 406). As used herein, the term "record" refers to information that is stored in an electronic or other intangible medium without limitations on how the data is structured. A record may include and/or point to related data. For example, a record for a unique ID may include the unique ID and any other data related thereto, which may be stored in database (308) or other appropriate data storage. After obtaining the manifest and/or the unique ID, the redirect/identification server (302) may then send the manifest together with the unique ID to the event user device (14a, step 408), which may be maintained on the event user device (14a) in a digital wallet, other secure repository, or both. At step (410), the redirect/identification server (302) may maintain a copy of the unique ID for further use in the method (400), other methods described herein, or both. If the event user device (14a) already has a manifest (step 404, yes), the redirect/identification server (302) obtains the unique ID from the manifest (step 410). In an embodiment, the redirect/identification server (302) may also obtain data such as current time, date, location, etc. from the event user device (14a), manifest, request, or combinations thereof at step (410).

In an embodiment, the redirect/identification server (302) may pass information needed to further method (400). For example, the tag ID may be passed to the interface server (306) for a tag ID lookup (step 412), such as in database (308), the administration server (310) and/or any other suitable database or server. In this instance, the redirect/identification server (302) obtained the tag ID from the request made by the event user device (14a). In an embodiment, the tag ID is appended to the URL, and thus the entire URL, or a portion thereof, may be passed to the interface server (306) for use in looking up the tag ID. Looking up the tag ID provides information about the venue (202) and/or event. To clarify, when a particular venue (202) installs tags (16a) and/or uses tags (16b), the tag IDs for the installed/used tags (16a, 16b) are associated with the point/location of interest and the particular venue (202). Thus, if a tag is installed proximate seat 1, row A, section 100, database (308) information associates the installed tag's (16a) tag ID and that particular seat (208), which is in that particular venue (202). Since the tag ID is known to belong to a particular venue (202), the interface server (306), the administration server (310) via the interface server (306), any other suitable server, or combinations thereof makes a series of determinations using the tag ID, which was received in response to a request from a user device (14a, 14b) prompted by scanning the tag (16a, 16b). One determination is if the venue (202) is actively implementing platform (20) services (step 414). For example, the venue (202) may have tags (16a) installed but it is no longer using the tags (16a), or it is not using the tags for a particular event. If not, the event user device (14a) is redirected to a global default target (step 416) that may inform the event user that the services are no longer available, are temporarily out of service, or the like. If the venue (202) is actively implementing platform (20) services, the method (400) may make another determination. At step (418), the method (400) may determine if a particular event is currently (or soon to be) in progress, or recently ended. In an embodiment, an event may be determined to be in progress based on the time that the event is scheduled to begin. Since many venues (202) open before the actual event begins, and close after the actual event ends, the window set for an event to be in progress may encompass a given amount of time before and after the actual activity begins/ends. In an embodiment, the time that the "event in progress" determination is made (step 418) may be recorded to serve as a timestamp to approximate the time that the event user device (14a) scanned the tag (16a). In other words, the unique ID, tag ID, and time determination may be recorded for later use, in certain embodiments. If the event is not in progress, the event user device (14a) may be redirected to a venue default target (step 420) such as a Web page for the venue, or another Web page such as a page to identify that an incident has occurred at the venue (202) at the location/point of interest in which the tag (16a) was scanned. Incidents may encompass any sort of incident such as a need for something to be cleaned up to calling emergency services.

If the event is in progress, the method (400) may also determine if the tag ID belongs to a grouping of tag IDs (step 422). Tags (16a, 16b) may be grouped for many reasons and in many different ways. Tags (16a, 16b) may also belong to more than one group. As one non-limiting example, in the stadium of FIG. 2, the tags (16a) may be grouped by seating type or section (e.g., FIG. 2, 222, 224, or 226), e.g., VIP seats may belong to one group, loge seats to another group, and discount/student seats may belong to yet another group. If data associated with the tag ID indicates that the tag belongs to a group, the event user device (14a) may be redirected to a target for the particular group. For instance, the target for users sitting in VIP or loge seats may be a Web page associated with event that includes premium content, offers, and the like, whereas the target for users sitting in discount/student seats may be a Web page having content and features that typically appeal to students, recent graduates, or the like. For example, certain sections may be defined as a "wagering section," and are conferred certain benefits, such as free beverages or food service, so long as they have purchased a ticket to the given section. Notably, the ticket to the given section may be priced at a premium, or where the premium price may include a pre-payment of funds for wagering. Thus, the method (400) obtains the information it needs to enable redirection to the appropriate group target (step 426). If data associated with the tag ID indicates that the tag does not belong to a specific group, the event user device (14a) may be redirected to an event default target such as a standard Web page for the event. Thus, the method (400) obtains the information it needs to enable the redirection (step 424) to the default target for the event. In an embodiment, the information needed for redirection may include a URL for the target with parameters, values, patterns, or the like appended thereto such as a target ID to identify the target and the tag ID.

Method (400) may simultaneously process other data such as looking up one or more records associated with the unique ID (step 428). In embodiments, the platform (20) may gather information relating to user activities via the user device and unique ID. For example, the platform (20) may gather data relating to tags that the user has scanned in the past (across a variety of different events, venues, or the like) and activities associated with those tag scans (e.g., purchases made, content looked at, coupons downloaded), although embodiments are not limited thereto. This data may be stored in association with the unique ID assigned to the event user device (14*a*). Thereafter, a controller may associate the unique ID, its record, its record location or the like with the tag ID, target ID, a URL, any other determined information, or combinations thereof (step 430). The event user device (14*a*) may then be redirected to the appropriate target that has been determined for the event user device (14*a*).

When a request comes from a remote user device (14*b*), the method (400) starts out essentially the same as with the event user device (14*a*). That is, the redirect/identification server (302) receives the request (step 402), checks for a manifest containing a unique ID (step 404), assigns a manifest with a unique ID if one has not yet been assigned (step 406), and sends it to the remote user device (14*b*, step 408) for secure storage thereon. If the remote user device (14*b*) has a manifest, then the redirect/identification server (302) obtains it (and other information such as a unique ID) from the remote user device (14*b*). Either way, the redirect/identification server (302) has the information that it needs such as unique ID, URL, tag ID, and the like, and forwards the information to the interface server (306) to continue the method (400). The interface server (306) may then look up, or cause to look up, the record associated with the unique ID (step 428) assigned to the remote user device (14*b*). At the same time, the interface server (306) may cause a determination to be as to whether the venue exists (step 414). In this case the interface server (306), or other server, may look at the data associated with the tag ID to determine from where the tag (16*b*) that was scanned originated. For example, the MRC (17*b*) may have originated from a particular signal, transmission, etc., (e.g., network, regional network, etc.), Web site (e.g., for the venue, a streaming service, etc.) or the like. If, the method (400) determines that the venue does not exist, for example, if the tag is to an unrelated element, then the remote user device (14*b*) is redirected to that unrelated element or to a global default target (step 416), for example if the tag is related. Assuming that the venue in this case does exist, the interface server (306)/method (400), then determines whether the event is in progress (step 418). If the signal, transmission, Web page, or the like is transmitting an event as it is occurring in real time then the event is in progress. Such can also be determined by a time stamp or time record set within the system. Either way, in an embodiment, the time the determination is made may be recorded by the platform (20). If the event is not occurring in real time (e.g., the user is watching a recording after the fact), then the remote user device (14*b*) will be redirected to an appropriate target such as a Web page relating to the event (step 420). However, the proprietor can set any time parameter to define "real time." For example, a proprietor may desire to allow recordings watched within N number of days of a live event to constitute real time. The interface server (306) may then determine if the tag (16*b*), via the tag ID belongs to a group (step 422). For instance, different tags (16*b*) may be associated with different signals, transmissions, Web sites, or the like. Some of these tags (16*b*) may form groups based on predetermined criteria. Thus, if the tag (16*b*) belongs to a group, the remote user device (14*a*) will be redirected to the target for the appropriate group, and if not, the remote user device (14*a*) will be redirected to the default target. The default target for remote users may or may not be the same default for event users. Either way, the information relating to the determined redirection target is obtained (steps 424, 426). At step (430), a controller may associate the unique ID, the record for the unique ID, a pointer to the record for the unique ID, the tag ID, and target information such as a URL, target ID, or both. Thereafter, the remote user device (14*b*) is redirected to the appropriate target (step 432), as was described with respect to the event user. In certain embodiments, the step of (428) may be provided in parallel to or concurrent with the lookup of the tag ID (step 412), where the unique ID is necessary for determining any of the other elements. Furthermore, the unique ID may be stored, for example in local memory or cache, which is readily accessible or known to the system after step (410).

In an embodiment, the user device (14*a*, 14*b*) may receive a redirect URL from the redirect/identification server (302) at the end of method (400) to redirect the user device (14*a*, 14*b*) to the appropriate target. For instance, the method (400) may return a target ID to identify the particular target. The target ID, tag ID, unique ID (and/or information associated therewith), or combinations thereof may be appended to the redirect URL for the target, which is sent to the requesting user device (14*a*, 14*b*). The requesting user device (14*a*, 14*b*) then uses the redirect URL to send a new request, this time for the target, which is received by the redirect/identification server (302) and is forwarded to the interface server (306) for processing. Alternatively, the target ID, tag ID, and unique ID may be used by the platform (20) without sending a redirect URL to the requesting device at the end of method (400). Regardless of the forgoing, the requesting user device (14*a* and/or 14*b*) receives the target of the redirection whatever that target may be. For example, a target may be a static Web page, a dynamic Web page, an application delivered by way of one or more Web pages, files, data, information, or combinations thereof. As one non-limiting example, the fan portal (218) may have been the target identified by the target ID, and it may include application code "wrapped" or embedded in in an HTML document. Application code includes, but is not limited to, Web application code, progressive Web application code, cloud-based application code, native application code, native mobile application code, other such code, or combinations thereof. The HTML document (and cascading style sheet, etc.) generally determines the format/layout of what the user sees as is known in the art.

Furthermore, targets are not necessarily static. In fact, the same tag (e.g., 16*a*) may cause a user device (e.g., 14*a*) to be redirected to distinct targets depending upon when the particular tag (16*a*) is scanned. For example, a venue (202) hosts many events over the course of a season, year, decade, etc. Each event may have its own target as the individual events are distinct. For example, the fan portal (218) may be the target of a game in progress, such as the football game shown in FIG. 2. The game in progress is between team A and team B. The next game (or other event) hosted at the venue (202) may be a soccer game; thus, the fan portal (218) for the soccer game is different from the fan portal (218) for the football game. In other words, the two fan portals (218) are distinct targets for redirection. The target that is reached by scanning the tag (16*a*) is coordinated with targets, such as via a distinct target ID, so that the user device (14*a*) is redirected to the football fan portal (218) during the football game and the same user device (14a) can be redirected to the soccer fan portal (218) during the soccer game even though the exact same tag (16a) is scanned by the exact same user device (14a). Of course, this is one non-limiting example. A single tag (16a) may be used by a proprietor to redirect a user device (14a, 14b) to any desired target. Thus, the target to which the user device (14a) is redirected may be changed from game-to-game.

A proprietor may also change a target during the course of a particular event. For example, referring again to the fan portal (218) shown in FIG. 2, the user may use the fan portal (218) to partake in activities such as buying food or merchandise, placing a wager, view replays, etc. However, at any time during the event, the jumbo screen (204) may display a hidden "unique offer" (214) that is only available to the first 1,000 users who respond to the "unique offer" (214) after it is displayed on the jumbo screen (204) by scanning a tag (16a) or the like. A countdown (216) on the jumbo screen (204) shows the number of event user devices (14a) that have claimed the "unique offer" (214), for example, a free bet, or a special deposit bonus, a higher payout, etc. When the threshold number (1,000) is reached, the unique offer may be revealed and is no longer available to any other users. Thus, to engage with users who may be interested in wagering, and limiting the offer, the system may be able to self-select for desirable user/customer targets. One way an event user may respond to the hidden "unique offer" (214) is by scanning or rescanning the tag (16a) while the unique offer (214) is available. In this case, the user device (14a) may be redirected to a Web page or the like, for the unique offer (214), e.g., to input information, select or make a bet, deposit money into a betting account, make payment, or the like, per a process that is the same as/similar to the method (400). The redirect target of this scan, however, is the "unique offer" (214) and not the fan portal (218). Another way a user may be able to respond to the "unique offer" (214) is by a pop-up window (e.g., in/over the fan portal [218]) or the like, which may be pushed via the socket server (324) in a non-limiting embodiment. Thus, the term "target" should be broadly construed although it may be described herein with respect to obtaining a fan portal (218) or more particularly, a wagering portal. One of ordinary skill in the art would understand a target of redirection as described herein may be a multitude of different targets with various purposes, designs, capabilities, and the like. Therefore, the target to which a particular tag (16a, 16b) is assigned, may be changed by simply changing the target identifier ("target ID") associated therewith. Thus, a redirect may take a user to a wagering page that has different lines than another user, based on some metric from the user device, the seat, or other element based on differences between users.

There may be instances where the content delivered via the target may need to be changed, updated, altered, released, opened, or other such stipulations based on a rule and/or other conditions. Rules may be defined to force a modification of content already delivered, deliver additional content, information, data, release content, and/or make other such changes as would be appreciated by one skilled in the art. In this non-limiting example, the target delivered at (432) FIG. 4 includes a Web application, such as a progressive Web application (PWA), that has a pull function, which may be rule-based. The pull function, as one non-limiting example, may be time based, requesting information to be pulled from the platform (20) via the interface server (306) every 10 seconds, minutes, N seconds, N minutes or the like. As another non-limiting example, the pull function has the ability to have data updated on a rolling basis. In the sporting world, this is common when updates are provided to the score of a game, the time left in a game, refreshed prop bets after each play, micro betting lines, or both as non-limiting examples. The platform (20), however, may push rolling data to a user device (14a, 14b) instead of having it pulled from the platform. Pushed data may be sent to user devices (e.g., 14a, 14b) without being requested. Data may be pushed to a user device (14a, 14b) for any number of reasons, a few of which are detailed herein. Thus, information, data, etc., may be pushed to a user device (14a, 14b), pulled for a user device (14a, 14b,) or both. In many instances, a Web application or the like may be based on a template having dynamic elements embedded therein. The contents of such dynamic elements may be altered via push techniques, pull techniques, or both. Content, data, information, and the like, may be pushed and/or pulled via a socket connect utilizing a socket server (324) or any other socket connection, communication connection, protocol, or combinations thereof as is available to the platform (20) under a set of given circumstances.

Figure 5:
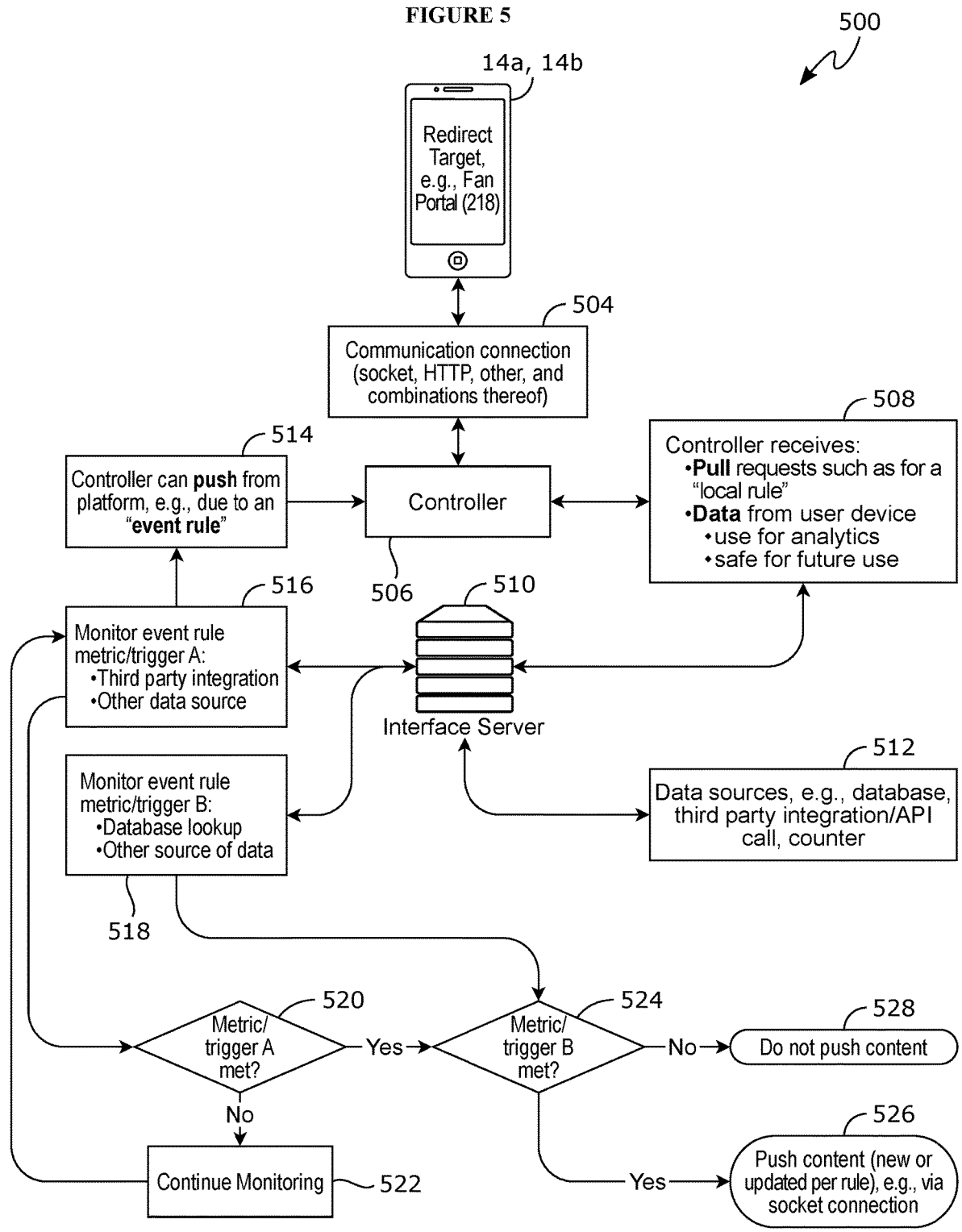
FIG. 5 depicts an embodiment of a system wherein the system is enabled to push or pull data or information or due to triggering events or rules to modify or augment a target delivered to a user device.

The method detailed in FIG. 5 may be invoked while the target of redirection (e.g., fan portal [218]) is loading on the requesting user device (e.g., 14a and/or 14b), after the target is already loaded on the requesting user device (14a and/or 14b), or both. As with all methods detailed herein, steps in the method (500) may be used in whole or in part, in the order shown or a different order, be executed on one device or more than one device, be used in combination with some/all of the other methods described herein or as is known in the art, or combinations thereof.

Using fan portal (218) as a non-limiting example while referring to FIG. 5, oftentimes it may be desired to alter information, regardless of type (e.g., video, images, instructions, wagering lines, etc.) while the user is using the fan portal (218). Indeed, the fan portal (218) maybe a wagering portal, wherein the fan is engaging with the portal to place wagers through the system. Information may be altered using push, pull, and other techniques, taking advantage of the communication connection (504). The communication connection (504), which may be a socket connection or any other appropriate type of connection, allows communications between the user device (14a and/or 14b) and the platform (20) via the one or more networks (18). A controller (at 506) may be a set of software code for managing, directing, or generally being in charge of one or more rules, enabling pushing and/or pulling of information per the rules. In this example, rules may be used to change content on the user device (14a and/or 14b). The interface server at (510) may be the same interface server shown in FIG. 3 (306), just at the data sources at (512) may be the same data sources shown in FIG. 3 such as database (308), administrator server (310), analytics server (312), blockchain (314), geofence (316), time (318), third party integrations (320), and proprietor portal (322), without limitation. Moreover, interface server at (510) may facilitate utilization of the forgoing, in the same manner or similar manner as described with respect to FIG. 3. Thus, in a sense, user device (14a or 14b), communication connection (504), interface server (510), and data sources (512) are shown in FIG. 5 just to help the reader visualize interactions detailed in FIG. 5.

Examples of rules that are detailed with respect to FIG. 5 include event rules and local rules, although embodiments are not so limited. Generally, an event rule is monitored by the platform (20) and if satisfied causes data to be pushed to one or more user devices (14a, 14b) and a local rule, when invoked, causes a user device (14*a*, 14*b*) to request data (i.e., pulls data) from the platform (20). An illustrative example of an event rule is if team "A" scores a touchdown, push a digital offer to all user devices (14*a*, 14*b*) that have scanned tags (16*a*, 16*b*). Here, the metric or trigger of the rule can be monitored (step 516) such as by directly sending a request or query to a data source (at 512) via the interface server (at 510), receiving data from the data source (at 512) on a regular basis such as every 5 seconds, 5 minutes, or the like (via the interface sever [at 510]), or combinations of both. The platform (20) may to monitor for the metric/trigger e.g., a touchdown (step 520) and continue to do so (step 522) until a metric/trigger e.g., a touchdown has occurred (step 520, yes). If the rule has been satisfied, the platform (20), can push the digital offer to all of the qualifying user devices (i.e., that have scanned a tag [16*a*, 16*b*]). Of course, these rules can be utilized in some embodiments to confirm the result of a wager placed on the system. However, these rules can also be provided to grant benefits to the user within the portal. Thus, when a trigger occurs, some benefit may be granted to the user, such as a reduced vig bet, a free play, a bonus payout, etc., as non-limiting examples.

A more complex event rule may include more than one trigger/metric. For example, the rule may be that if team "A" scores a touchdown, push a coupon for a free $10 wager to all event users over the age of 21 that have used their user device (14*a*) to scan a tag (16*a*) in the venue (202). The first metric/trigger of whether a touchdown has been scored may be monitored as described above. The second metric/trigger may be monitored (at 518, 524) in the same or similar manner if the metric/trigger warrants, or it may be determined before or after the first trigger/metric has been satisfied. For example, since in this example the second metric/trigger relates to age, a query may be sent to one or more data sources (at 512) to find all users who are over the age of 21. Records stored on database (308), for example, may be consulted to look for age data in connection with unique ID data to determine if the person who has loaded the fan portal (218) on his/her device (14*a*) is of legal gambling age. As an alternative source of data or for any other reason, the interface server (at 510) may cause another data source (at 512) to be consulted to determine user age. For example, one or more third-party integrations (320) may have age information; thus, an API call or other query may be made to the third-party integrations (320) to obtain age data. As with the first example, if the first metric/trigger (step 520, no) is not met (i.e., touchdown), then the platform (20) continues to monitor the metric/trigger (step 522). If the metric/trigger (step 520, yes) has been met the platform (20) determines if the second metric/trigger (518) has also been met (step 524). Where the second trigger/metric has not been met (step 524, no) then the target on the user device (14*a*) is not updated (step 528), such as with the digital offer. Depending upon the rule, the second metric/trigger may continue to be monitored or not. For example, if the digital offer was to be sent only one time, then the rule is satisfied, and no additional monitoring is needed. If, however, the rule is to send the same digital offer (e.g., for a free $10 wagering play) every time team "A" scores a touchdown, the second metric/trigger would not have to be redetermined since even if the user turned 21 that day, the user's age would not change. Of course, if the event went past midnight, the rule could be structured to recheck ages after midnight. This does not mean that for a given rule a second (or third, or fourth, etc.) trigger/metric would never need to be monitored. Should an additional metric/trigger be defined by a rule that needs additional monitoring, the method (500) will be allowed to do so. Going back to step (524), if the determination is yes, the digital offer may be pushed (526), such as via the controller (at 514, 506) to those users who have scanned a tag (16*a*) and who are at least 21 years old. Pushed content may update an element, such as a dynamic element, on a Web page, cause a popup to show on the user device (14*a*, 14*b*), send content to a digital wallet (24*a*, 24*b*), or any other way to push content as is known in the art.

Local rules, as an example, may be associated with one or more targets being utilized for a given event. Referring again to FIG. 2 as one example, each section of seats (222, 224, 226) may represent a grouping of tags (16*a*) such as student/discount seats, loge seats and all other seats. As such, when a tag (16*a*) is scanned by a user in section (222) the device (14*a*) may be redirected to first template of fan portal (218), when a tag (16*a*) is scanned by a user in section (224), the user device (14*a*) may be redirected to a second template of a fan portal (218), and when a tag (16*a*) in section (226) is scanned the user device (14*a*) it may be redirected to a third template for a fan portal (218). Thus, all users may be redirected to a fan portal (218), but each fan portal (218) may be based on a different template. In this way, a proprietor may deliver customized content to users in different sections based on the template to which the user device (14*a*) was redirected. Local rules, other elements, or both may be written into each template to further customize content, which in some instances may be on an individualized level. That is elements of application code may be rules built into the system to provide the content delivery determined by the system, or can be applied at an earlier stage, e.g., at a tag ID group target information (step 422), which can provide a different original redirect URL/target than is received by or directed to, for another tag ID in a different group.

Referring back to FIG. 5, the interface server (306, at 510) may determine, or cause to be determined, if there are any rules associated with a given template (e.g. for fan portal [218]) or another target. This is especially true where the rule may be designed as an event-type rule where content may be pushed to a device (14*a*). In this case, however, the rule may only be provided in a given template (e.g., for users sitting in loge seats). A given template, however, may also have local rules written therein. For example, a rule associated with a fan portal (218) template to be distributed to loge seats, may be if the user has season tickets, then include a digital offer for a free $20 wager on the wagering portal. Thus, per this illustration the local rule may desire to pull/acquire (at 508) season ticket information before, during, or after the template for the loge seats is loaded on the event user device (14*a*). To obtain this data, the database may be queried (at 512), via the interface server (at 510), using the unique ID to check data records for the requested information (e.g., purchased season tickets). As with the push example, if the database (at 512) does not store such information, the information is inconclusive, the local rule requires confirmation from an outside source, or other such situations, other data sources (at 512) may be consulted via the interface server (at 510). If the local rule is satisfied, then a digital offer for a free $20 wager in the wagering portal is sent to the template. If the local rule is not satisfied, then the template uses a "default" digital offer/content such as an ad to place wagers, or for a lower value free play, or another, similar example.

In an embodiment, data associated with the unique ID may be pre-analyzed to see if the local rule has been satisfied. Alternatively, data associated with the unique ID may be gathered (e.g., from a database, a third-party integration such as a ticketing service, or the like) and analyzed when the event user device (14a) makes the request. As yet another option, the data may be pre-analyzed and verified/checked for changes upon the event user device (14a) request. The interface sever (306) may take all of the variables from the target application code, template, rules, and the like and send requests/queries to the appropriate data sources or links to the data sources (at 512). The data sources may include data from the database (308), blockchain (314), geofence (316), timestamp (318), third-party integrations (320) such as data servers/databases, analytics server (312), and administration server (310), and a counter (at 512), without limitation.

In some implementations, a counter may be needed. For example, a counter may be enabled to maintain the countdown shown in FIG. 2 (216). A counter may be software on platform (20) that may be used as a counting mechanism for rules or other reasons. As such, the counting mechanism may be configured to meet the counting requirements of a rule or other counting need. As an illustration, a counter may count the number of tags (16a) scanned in a venue (202) during a particular event; count the number of tags (16a, 16b) scanned by a particular user device (14a, 14b) in a predetermined time window; count the tags (16a) scanned by a particular user during a particular event; count the number of times a user has interacted with the target delivered to that user device; count the number of tags (16a, 16b) scanned by a plurality of user devices (14a, 14b) active at a given time, or other such non-limiting illustrations.

Thus, while a target is displayed on a particular device (14a, 14b), dynamic content may be seamlessly and dynamically updated/changed per coding/interactions between the user device (14a, 14b) and the platform (20). Certain dynamic changes occur through push and pull techniques such as those detailed by FIG. 5. However, dynamic updates/changes may further take place through the use of various third-party application programming interfaces (APIs) and their respective functionality. At a high level, the interface server (306) may connect, or may cause the third-party integration server (320) to connect, to third-party hardware/software (e.g., server) via one or more third-party APIs/API calls to access the respective third-party integration/functionality as is known or will be known in the art. Thus, third-party integrations/functionality may push or pull information through analytics server (312), retrieve it from database (308) or another data store, or combinations thereof, for real time/live streaming, updating, changing, and the like as is called for by rules/instructions associated with the target of the tag ID. Furthermore, embodiments allow for the use of interactive, two-way communications between user devices (14a, 14b) and the platform (20) such as via the socket server (324) and/or a socket API, or the like as is known in the art. Certain communications then end, upon the end of the event or where the user closes the application, where the communication (at 504) is severed.

As is also indicated in FIG. 5 at (508), the platform (20) may collect a large amount of data via user devices (14a, 14b). For example, after scanning a tag (16a, 16b) the platform (20) may receive data from the user device (14a, 14b) such as date, time, and GPS or other location, the device orientation (i.e., landscape, portrait), type (e.g., iPhone, Android), IP and other addresses, and operating system as a few examples. Thus, methods such as methods (400, 500, or both) may be configured to collect and aggregate data. Additionally, tools such as cookies, widgets, plug-ins, and similar tools may also be used to obtain data from user devices (14a, 14b). This, and other, information may be stored in a data source (at 512) such as database (308) or other data storage and in association with the unique ID. Data acquired using the aforementioned tools and other tools/techniques may relate to user engagement with a target such as a fan portal (218) as one non-limiting example. Such data may relate to digital offers presented to the user, digital offers downloaded by the user, products viewed by the user, purchases made by the user, to name a few examples. Such tools/techniques may also gather data relating to other user engagements such as total screen time, Internet browsing (times, sites/pages accessed, software used), updates to Web pages, other Web sites visited, the Internet, and the like. The user may also directly provide information via the user device (14a, 14b) such as by inputting personally identifiable information to obtain opportunities or offers such as unique information relating to user interests, user responses to questions, generic information about age or sex, or any other type of personally identifiable information. Such data is of high value to, for example, advertisers, proprietors, and the like, as it provides a large insight into consumer purchasing and Web browsing habits.

Data related to user devices (14a, 14b) may also be obtained from third party sources. As one example, when a query, request, or the like sent to a third party, the platform (20) may provide certain information with that query, request, etc., such as the unique ID, tag ID/target information, or combinations thereof. Thus, data returned by the third parties may also be stored (e.g., temporarily, or persistently) in association with unique IDs, tag IDs, target information, or combinations thereof. As one non-limiting example, service providers such as mobile/cellular providers may be queried to obtain information about user devices (14a, 14b). The unique ID identifying a particular user device may be sent to the service provider to obtain information about the particular device, or the service provider may provide information that may be later associated with a particular device. Either way, the platform (20) may collect and store information about users via the unique ID assigned to each user device (14a, 14b). As another non-limiting example, information associated with unique IDs assigned to user devices (14a, 14b) may be collected from various third-party integrations (320) such as in-venue/event metrics, integrated third-party metrics, ticket brokerage, and other tools, without limitation to the forgoing. In-venue/event metrics may include data collected relating to the venue, event, or both. For example, information relating to user purchases at the venue and/or during an event such as tickets, food, merchandise, and upgrades and the like may all be gathered and stored in association with the unique ID. Similarly, ticket brokerage integrations (e.g., 320) may be used to gather information from ticket brokers who sell tickets for the venue (202), event, or both, and may include a wide range of marketing data, not only about ticket purchases made, but also related information about the user. Thus, third-parties, including third party metrics integrations (320) may enable collecting information about users, user devices (14a, 14b), or both from third parties including those who participate in a shared program or who sell or otherwise provide marketing information, demographics, and other data about the user.

In addition to collecting and storing data associated with unique ID, the platform (20) may analyze such data, which may or may not be recorded in association with unique IDs. Data analysis may occur while it is being collected, after it is collected and before it is stored, after storage, or combinations of the forgoing. Data, raw, analyzed, or both, may be stored in database (308) or another data store (at 512) such as blockchain (314), without limitation. The analytics server (312) may communicate with various aspects of the platform (20), to ensure data received from various sources is appropriately captured for decision making, analytics, and the like. That is, analytics server (312) may communicate with (either directly or via the interface server [306]), user devices (14a, 14b), third parties, third party integrations (320), time/timestamp (318), geofence (316), blockchain (314), database (308), even proprietor portal (322), or combinations thereof, so that data is captured as needed for desired analytics, decision making, and the like. For example, data may be subject to artificial intelligence analysis include machine learning/pattern recognition/deep learning as is now known or will be known in the art. Collected and/or analyzed data may be coupled with other information relating to the user/user device (14a, 14b), such as the unique ID associated with the user device (14a, 14b) for a variety of reasons, including content selection as one non-limiting example.

Content for display on user devices (14a, 14b) may be customized in numerous ways as has been detailed with respect to methods (400 and/or 500). Content may also be customized where data/data analysis shows that a user has, or group of users have particular preferences. These preferences may be utilized to modify content, such as advertisements that are delivered to that user/group of users. Furthermore, data analysis may allow the proprietor to generate rules specific to a user/group of users, send custom e-mails, push socket notifications or other messaging based upon the user's interactions/group of users' interactions with the platform (20), other such similar examples, or combinations thereof. Indeed, this provides for multiple opportunities for interaction and communication between the proprietor and the user to continue building relationships that can then be mined for longer-term relationships. As yet another implementation, the platform (20) may utilize unique IDs together with known information associated therewith to deliver unique advertising to users via third-party advertising services. For example, where available, the platform (20) has the ability to interface with advertising platforms to deliver a customized experience based on the user's search history or user information as a whole. Taking the forgoing together, it should be apparent that content provided to a particular user or group of users may be customized or modified as was described above with respect to FIGS. 4 and/or 5 and that data/information gathered as the user is engaged with the event target or the like, may be used to update/modify target content in real time, upon a subsequent scan of tag (16a, 16b) by the user device (14a, 14b), or both (e.g., at 508). For example, the socket connection (at 504) may be used to deliver pulled content, push content, notifications, and the like, and/or dynamically update content while the event is in progress.

Analytics may also determine which feature, elements, or the like provided by a target such as the fan portal (218) a user or group of users interact with the most or spend the most time viewing. Thus, advertising on high-usage pages, features, elements, etc. may come at a higher cost. In other words, proprietors may charge a premium to advertisers wishing to purchase the ability to place content, such as advertisements or digital offers on the pages or features of the fan portal (218) or other target that receive the most traffic.

The forgoing has been described largely with reference to a sports environment where event users can scan tags (16a) located proximate each seat (208)/other point of interest or remote users can scan MRCs (17b) that appear on a screen such as a television or computer display. Other environments may utilize the same sort of tag (16a) placement strategy, such as horse racing or dog racing venues (16a) may be placed proximate a seat. While some other wagering events are made available to the public at large, many smaller venues only provide wagering opportunities to those individuals actually at the venue. Thus, these proprietors may enable an option to remotely access the live events such as via an account on a Web site where the user can scan an MRC (17b). Alternatively, certain remote users may receive a digital communication such as an e-mail or physical communication such as a card or badge that is similar to a credit card having information encoded thereon so that the remote user can scan the MRC (17b) on the badge to access the target that is associated with the scanned MRC (17b). In this way, remote users that are unable to attend a particular live event may still be able to access wagering opportunities thereof via platform (20). And since the target for remote users may have distinctive features enabled (e.g., replays, filters) during the event that are not available to an event user (so as to not distract the performers) the remote user may be able to watch the entire event on the remote user device (14b) and access other target features simultaneously.

Certain venues that offer wagering may utilize the tags (16a) already in place at the venue (202) in which the event is being held if the proprietor so allows; alternatively, event proprietors may utilize a system that is not attached to the venue (202), or they may use both. As an example, event proprietors may include tags (16a) separate from or integral with certain event tickets, passes, credentials, or the like so users can scan (or click on if digital) the MRC (17a) to access the desired target. In an embodiment, the ticket, pass, credentials, or the like may be a badge or badge-like so that it can be attached to a lanyard, put in a wallet, etc. Lanyards may be distributed with the ticket, pass, credentials, etc., or they may be purchased. As an incentive to purchase a lanyard, the lanyard may be associated with its own tag (16a) and associated target (e.g., a digital offer). In an embodiment, remote users who are unable to actually attend the concert may still be able to enjoy certain aspects of the event, including wagering, via the tag (16b) associated with a ticket, pass, credentials, etc. In an embodiment, remote users may opt to purchase just a tag (16b) so that they may enjoy certain aspects of the event without being there. As one non-limiting example, the tag (16b) may enable the remote user to access live video of the event, which would not otherwise be available without event attendance.

A key to legal wagering around the world is the requirement to be of a certain age to place a wager. Thus, with regard to FIG. 6, wagering provides certain unique challenges that are not found for simple delivery of goods or services at a venue or for simple interactions with a team or media within a venue. The identity of a user is important for at least two reasons. First, most jurisdictions require a certain age before someone can legally wager. Secondly, the identity of the user is important to ensure safety of a user device and that the wagers are being placed by the person's identity who is purporting to make the wagers and not by an unauthorized individual.

Figure 6:
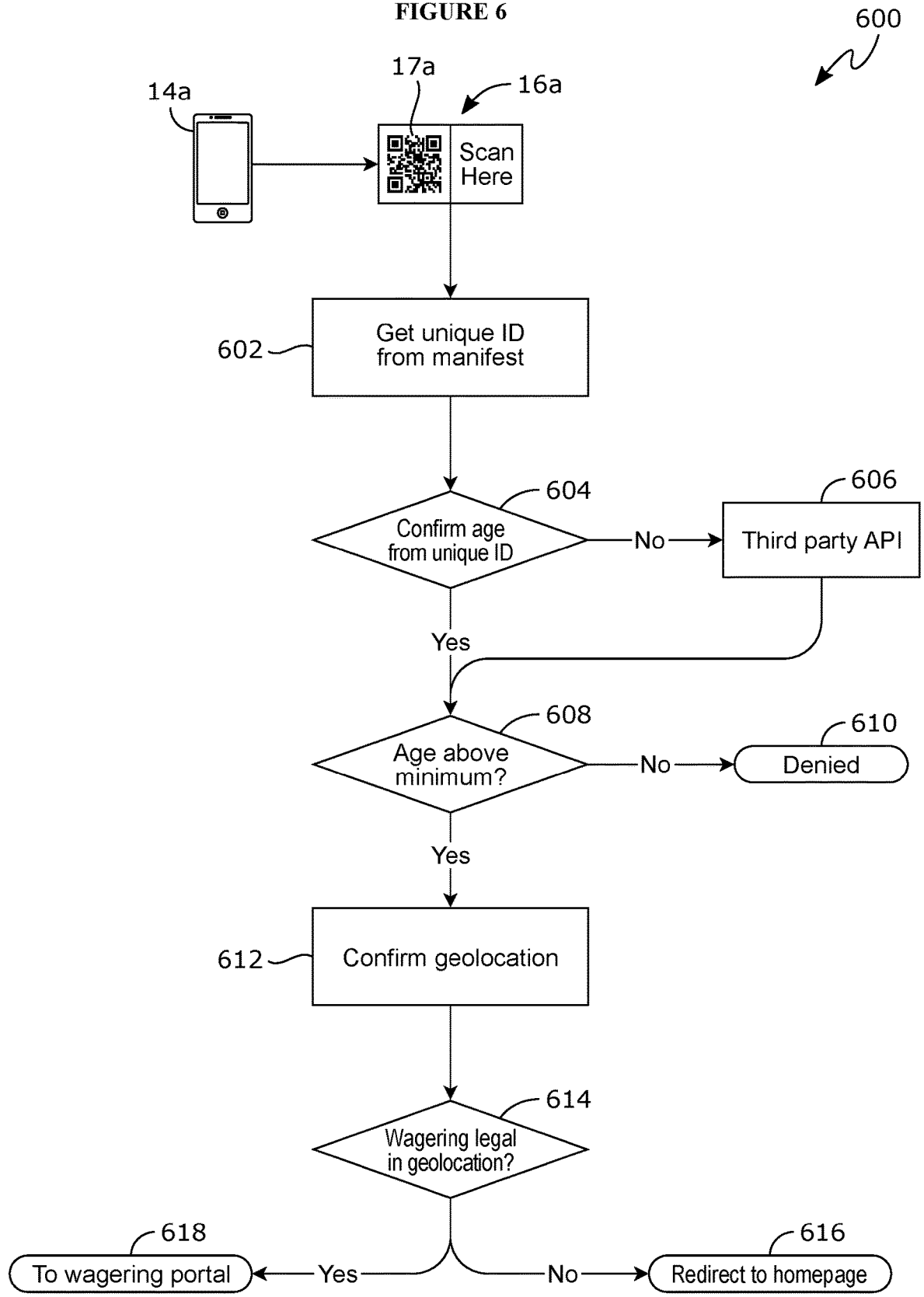
FIG. 6 depicts a flowchart of verification of age and geolocation for determining access to a legal wagering platform.

As provided in flowchart (600) in FIG. 6, a user device (14a) scans a tag (16a) comprising a machine-readable code (MRC) (17a). As detailed above with regarding to FIGS. 4 and 5, such actions include interaction with a redirect/identification server (302) to seek a manifest comprising a unique ID (602). The next step is to confirm the age of the user related to the unique ID (604). The unique ID, as addressed herein is assigned to the user device and then corresponds to data within a database related to that unique ID. Thus, information that has been provided or obtained regarding the unique ID is accessible via the database record related to the unique ID. Common information that may confirm age would be a birthdate, a copy of a driver's license, mobile or digital driver's license or other government identification. However, other information may also provide evidence of age, such as a purchase history of alcoholic beverages, or membership into other groups or entities that require an age be given for membership (i.e., senior citizens groups). Thus, the step asks if there is information corresponding to the unique ID that confirms age. Preferably, the user can take a picture of their driver's license and upload it through a fillable form, portal, GUI, Web page, Web app, or progressive Web app, wherein the upload is stored with the database record corresponding to the unique ID. If no, then step (606) utilizes a third-party API to seek such information. As it is often required to have a copy of a license or a given birthdate for certain third-party activities, such information can typically be confirmed via one or more APIs. Otherwise, if the unique ID confirms age, then once age is obtained, step (608) determines if the age is above the minimum. If no, the user is denied (610) and would be redirected to a homepage or any other designated target that is not a target related to legal gambling. If yes, then age is confirmed. This step alone may be sufficient to allow for legal wagering, as the user device may have already confirmed or registered that it is present in a legal wagering location.

However, it may be necessary to perform a geolocation process (612), either for confirmation of a prior location determination, or as required by law. The simplest step is to perform a geolocation test and confirm the geolocation. Once the location is determined, step (614) queries whether wagering is legal in the geolocation (614). If wagering is legal in the location, then the user is redirected to the wagering portal (618). If wagering is not legal at the location, then the user is redirected to a homepage (616) or any other target URL designated by the administrator or proprietor. The steps above can be easily performed on the system in view of FIGS. 3, 4, and 5, which outline the various servers and pathways to perform the necessary steps.

Thus, wagering, in particular, has requirements related to the identification of an individual beyond just their age, as some individuals may be prevented from wagering due to unpaid balances or other legal reasons. Furthermore, while many jurisdictions allow legal wagering, there are numerous others that do not. Therefore, a user device must be in a defined location in order to legally place a wager based on local and federal laws.

Figure 7:
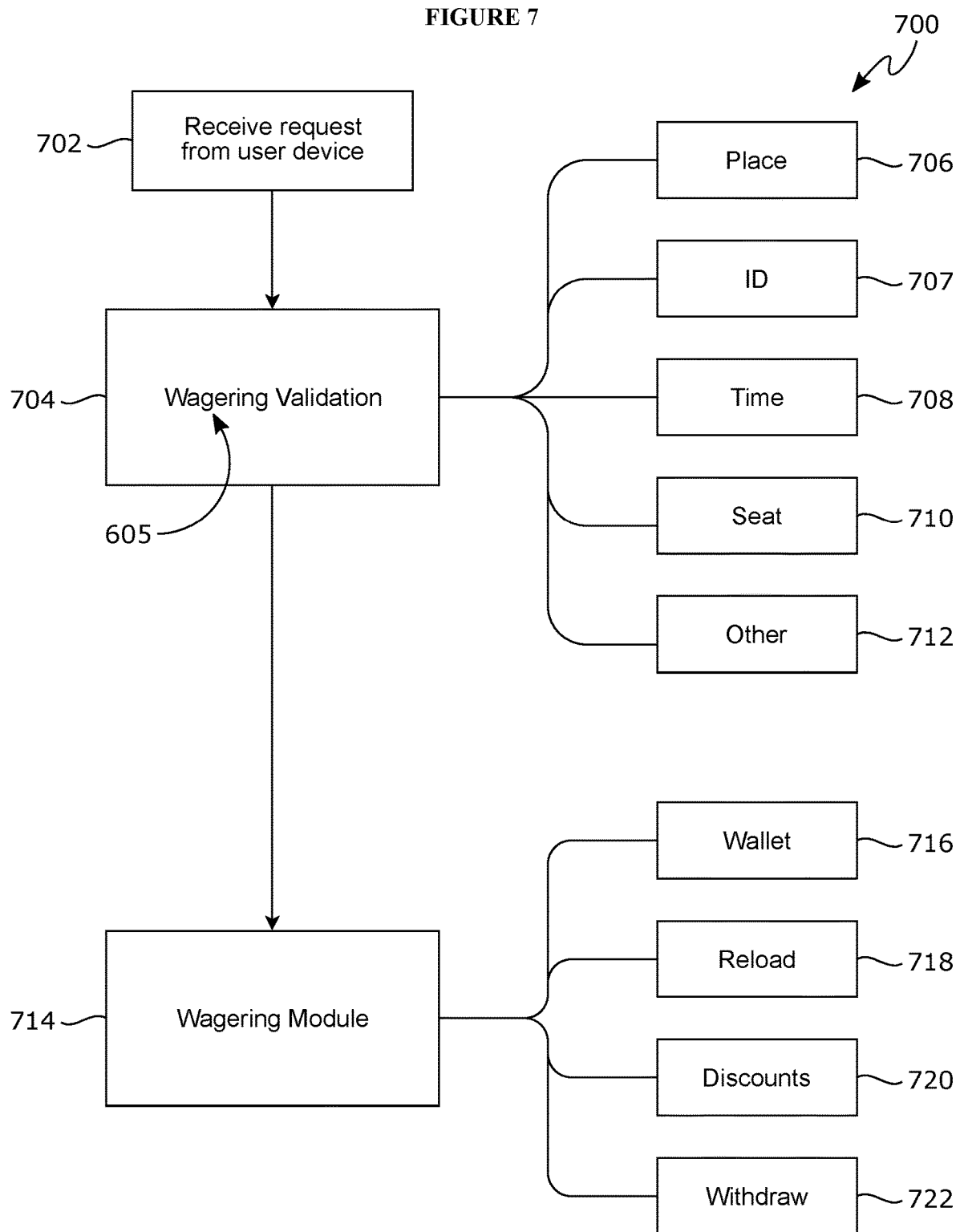
FIG. 7 provides an embodiment of a system for wagering which includes a series of queries to determine valid wagering, as well as elements necessary for placing wagers through the system.

FIG. 7 provides an overview of an embodiment of the wagering platform (700), including inputs related to confirming and validating the right to access the platform, and then the wagering platform or module itself.

Continuing with our in-stadium example of FIG. 2 and an exemplary infrastructure of FIG. 3, recall that the in-venue tag (16a) has a tag ID encoded thereon and the user device (14a) comprises a unique ID (22a) and a storage/digital wallet (24a). Preferably, the digital wallet (24a) includes the ability to buy, sell, and store currencies and/or is linked to another wallet (not shown) that does. Thus, digital wallet (24a) may include a number of passwords and other barriers to entry. Before method (700) begins, the user scans the tag (16a) with user device (14a) and sends a request, which is received (step 702) to initiate method (700). This request may be the first request sent by the user device (14a), specifically to validate the right to enter the gambling module, or it may be a request made via the fan portal (218) via a selectable option (220), which would have the appropriate label for wagering options. In other words, user device (14a) as shown in FIG. 2 has already scanned tag (16a) on the seatback (210) in front of it and gone through methods (400, 500) to be redirected to the fan portal (218) as has been described with respect to the forgoing methods. In this instance, however, the fan portal (218) may include a selectable option (220) that may initiate a request to wager without having to rescan the tag (16a).

In response to the received request, the platform (20) may engage (step 704) an embodiment related to validating the rights to wager. The rights to wager require, typically one or more of an identification (707), that confirms the age of the user. Furthermore, it may require a particular place (706), which is a geographic location where wagering is legal. Furthermore, it may be necessary in one or more embodiments to confirm the time (708) related to whether wagering is legal or available, or whether an event is then ongoing to allow for wagering on said event. In certain other embodiments ownership of a particular seat (710) is also necessary. Seats, as detailed herein, may include certain included rights such as a pre-paid dollar amount within a wallet, preferred betting lines, increased odds, refunds on certain losses, and other wagering options, etc. In addition to the seat (710), other limitations (712) may also be included to validate wagering (704) by either the casino offering the wagering lines, the venue, or another proprietor engaged in the activity. The degree to which confirmation is required may vary from embodiment to embodiment, which will become apparent from the examples provided herein. In an embodiment, the wagering validation is invoked upon an initial scan of the tag (16a) as described with respect to FIG. 4 as the place (706) and time (708) are confirmed or denied at steps (414, 418). That is, in response to scanning a tag (e.g., 16a) the platform (20) confirms the venue (202) in which the tag (e.g., 16a) was scanned (step 414), and that the time (708) of tag scanning corresponds to the time in which the event is in progress (step 418), as is described with respect to FIG. 4. Recall that the unique ID (22a, 22b), tag ID, and time of determination (method [400], step [418]) may be recorded for later use such as by the wagering validation (704), including the ID verification (707) step, as outlined in more detail in FIG. 6. In certain embodiments this is all the confirmation that is needed to enable a validate the right to participate in the wagering module (714). In other embodiments, confirmation requires more than the initial confirmations provided at steps (414, 418).

In an embodiment where confirmation has been received by simply scanning the tag (16a, 16b) regardless of whether or not the tag (16a, 16b) is physically/digitally in the venue (202), the user may gain access (step 714) to the wagering module. The wagering module may enable a user to then access the user's wallet (716), or to reload money (718) into the wallet, as well as to participate in certain discounts (720), which may include discounts or bonuses on a reloading of money into the wallet, free plays, reduced juice wagering, refunds, etc. Finally, the casino and/or wagering provider must allow those fortunate enough to win to withdraw those winnings (722). While not detailed, the withdrawal (722) of funds from one online account to another is known by those of ordinary skill in the art and can typically be performed by simple transfers of balances from the wagering platform to a bank or online account. As one example, the wagering module (714) may be the initial target to which the user device (14a, 14b) is redirected upon scanning the tag (16a). Thus, if approved by the wagering validation (704) the redirect URL for wagering module (714) may be sent to the user device (14*a*, 14*b*). See, e.g., method (400) at step (432). As another example, the wagering module (714) may be represented as a selectable option (220), within the fan portal (218). The selectable option (220) may appear automatically or automatically unlocked upon additional confirmation by the wagering validation (704) process running in the background. Alternatively, a selectable option (220) may be "greyed out" or the like until enabled upon subsequent confirmation initiated by an attempt to select the "greyed out" version or a selectable "confirmation" option (220) or the like. Upon selecting the wagering option, a landing page or the like may be displayed to guide the user through the appropriate acquisition process. Embodiments, however, are not limited to these examples.

Figure 8:
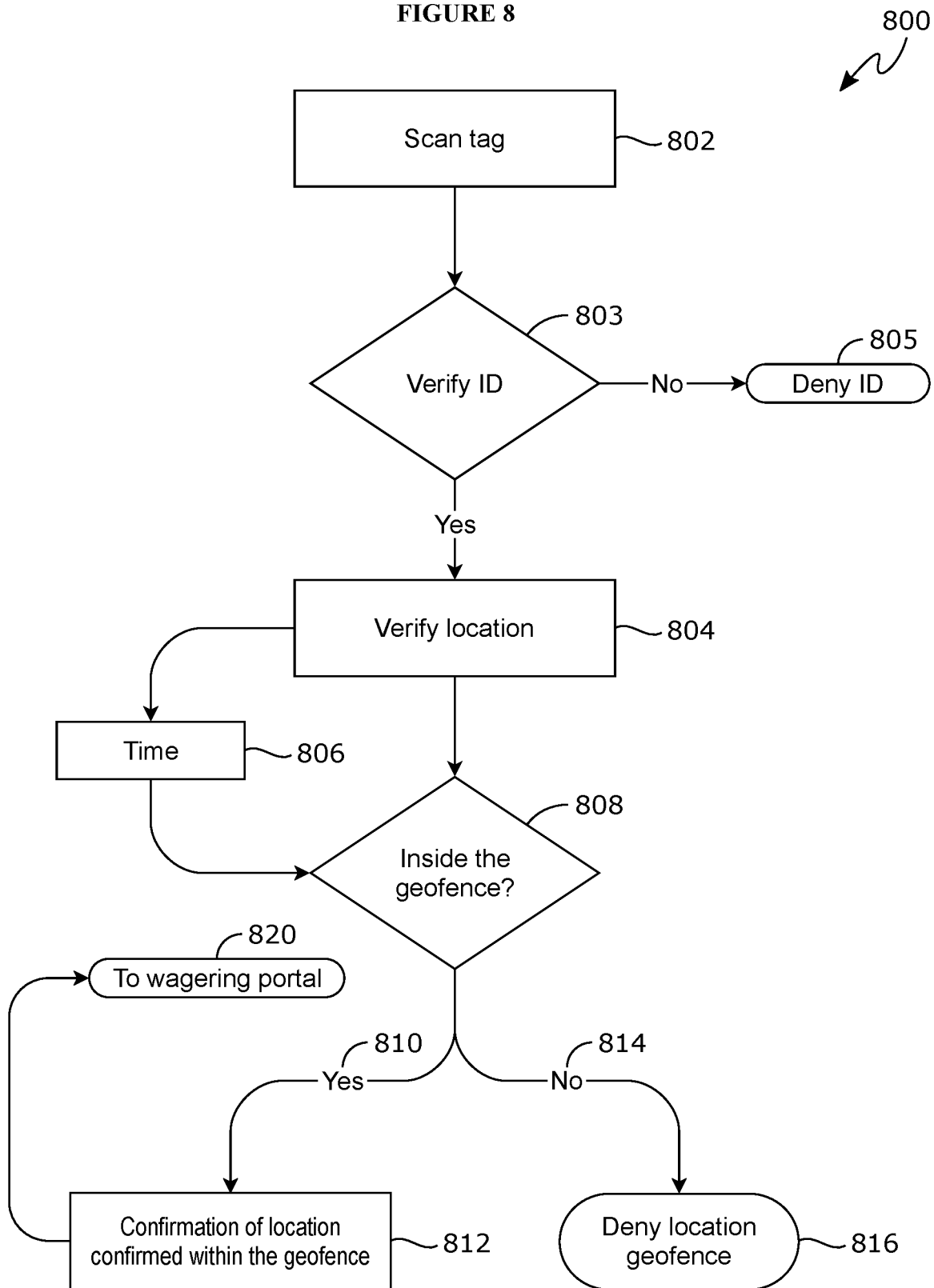
FIG. 8 provides a flowchart regarding age, location, and time based on the scan of a tag within an embodiment of the system.

FIG. 8 provides another simple flow diagram of required elements for wagering by verifying the identification of the user, verifying the location as being legal by determining a geofence, and redirecting to the wagering portal when a $50 free bonus bet is identified on the jumbo screen to users scanning the MRC within a given time. Thus, at step (802), the platform (20) may receive a request for the wagering platform from many user devices at the same time due to the MRC displayed on the jumbo screen (204). At step (803), the platform (20) verifies the unique ID and/or the tag ID. If the verification cannot be completed, then the ID is denied at (805). If the verification can be completed, the next step is to verify the location (804). The tag ID for the tag (16*a*)/MRC (17*a*) on the jumbo screen (204) would indicate that the venue exists, and the event is in progress per method (400). Since the jumbo screen (204) may be shown on a national broadcast of the game, or a user at the stadium has recorded the unique offer (214) and posted it on social media or other such situation, the location (step 804) of the requesting user devices (14*a*, 14*b*) may be checked to determine if it is within the geofence (316). In this example, the time (806) of the request (step 806) may also be checked to ensure that the requesting user device (14*a*, 14*b*) is within the geofence (316) at the time (708) the request has been made (step 808). As a non-limiting example, the time (708) may be re-checked (step 806) by consulting the recorded time data that was associated with the unique ID and tag ID when the request was made or via a time check (318), as is generally known in the art. If the user device (14*a*) is within the geofence (316, step [810]), then the user device (14*a*) is approved or confirmed (812) by the wagering validation feature (605) and the wagering portal is made available (820) to the user device (14*a*). If the user device (14*b*) is not within the geofence (316, step [814]), the user device (14*b*) is not approved by the wagering validation feature (605) and the user device (14*a*) is unable to legally wager (step 816).

If the promotional opportunity is limited, a rule is instituted to limit the parameter of the promotional offer. An example of such rule could be the promotional credit is only available for 10 minutes, or before the next inning, or to the first 100, first 500 or N users to scan the tag (14*a*). To finish the example, after the first 100 in-venue users have acquired the free $50 bonus bet, which is the unique offer (214), then the offer is disabled and any further attempts to acquire the free $50 bonus bet are redirected as appropriate, such as a page indicating that the offer has expired, or redirected to a home page, or venue page as determined by the administrator or the proprietor. Thus, if the user device (14*a*, 14*b*) is inside the prescribed geofence (316) at the given moment the determination (step 808) is made, then the user device (14*a*, 14*b*) may be approved by the wagering validation (704), or it may have to undergo additional confirmation. For the geofence (316) to be of use in any particular instance, the meets and bounds of the geofence (316) must be set. Furthermore, since time (708) was also used by the wagering validation (704) in this example, it is possible that the user device (14*a*, 14*b*) may be within the prescribed geofence (316), but at the wrong time (step 806), and for this reason may be denied confirmation. The exemplary process (800) of checking whether a user device (14*a*, 14*b*) is within a predefined geolocation is simple, but elegant in allowing for confirmation related to location at the exact time of scanning the tag (16*a*, 16*b*), and such information is difficult to fake. Indeed, because user devices can move, it may always be necessary to perform this supplemental time check (806) or re-check geolocation (808) before or after N number of bets are made, to ensure the betting remains legal, based on local and/or federal wagering laws.

Figure 9:
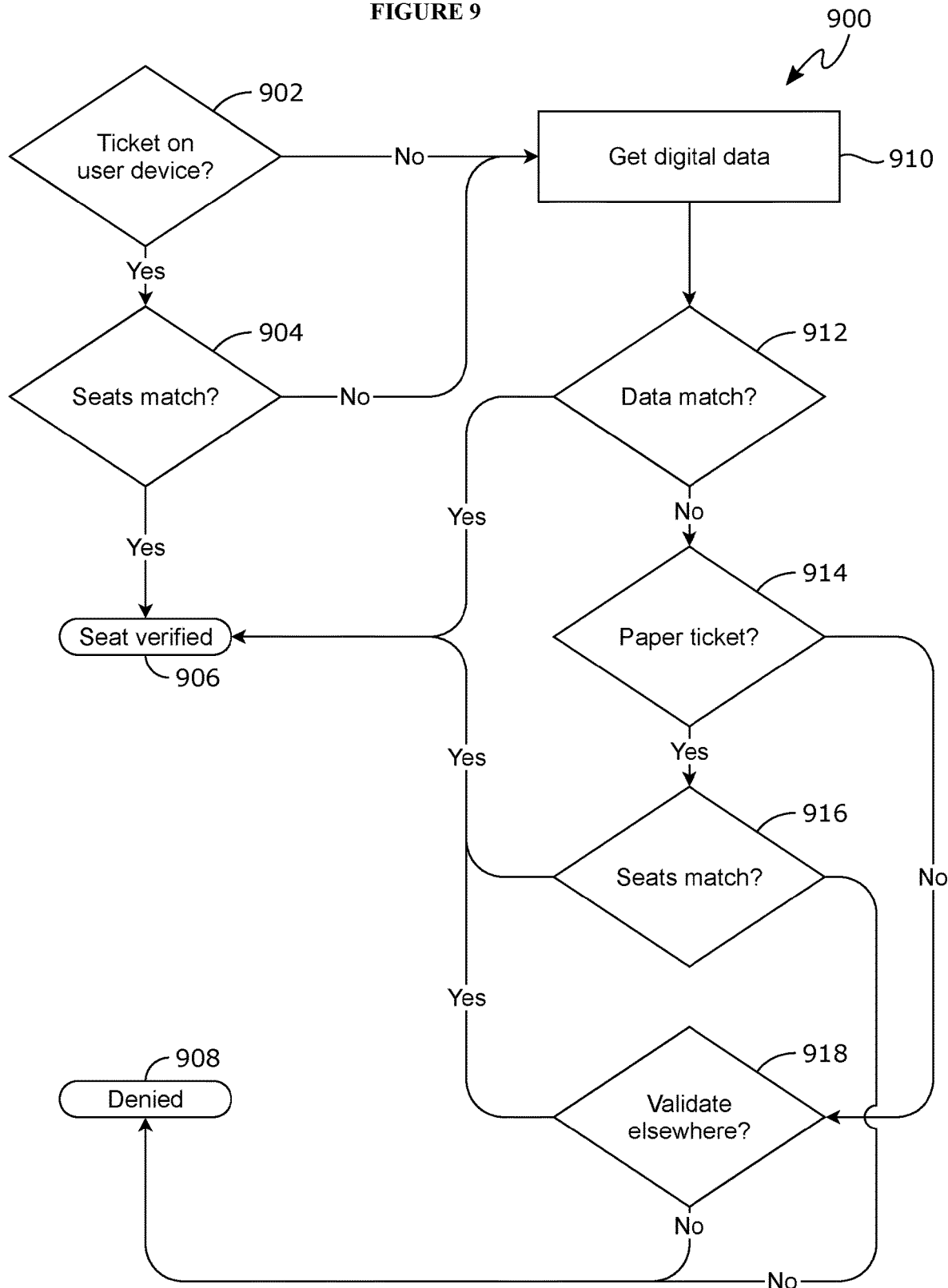
FIG. 9 depicts a flowchart for use of an embodiment of the system using a multilevel approach toward confirming ownership and rights to a seat, which may confer certain rights within the wagering portal.

FIG. 9 details a further embodiment of the wagering validation (704) wherein the rights and/or privileges afforded to a given seat in a venue (202) are approved as one example. Returning to the example of FIG. 2, in this scenario, the user purchased a ticket for seat 1, row A, section 100. Certain rights/privileges may be associated with that exact seat, such as a particular section that allows for wagering, an increased ticket price that includes a preloaded amount of dollars in a wagering wallet, a reduced juice during the event, or other wagering specific or general benefits. Thus, the wagering validation (704) may need to confirm that the user sitting in seat 1, row A, section 100 is the same user that purchased the ticket for the seat. If not, the user sitting in the seat may not be entitled to any rights and/or privileges that come with seat ownership for the event.

As one nonlimiting example, seat 1, row A, section 100, may have a special meaning or value associated therewith for a given event. In this example, the venue (202), has an NFT lottery and the winner is granted the ability to acquire the NFT whether it is free, part of an auction, straight purchase at a given purchase price, and wherein the NFT confers some further benefit, such as access, or gambling specific rights, such as a free $50 bet each game, or reduced juice, or other gambling specific benefit. Seat 1, row A, section 100 is the winning seat of the lottery. Thus, wagering validation feature (605) may seek to ensure that the user device (14*a*) requesting the ability to acquire the NFT, and thus the wagering benefit, is associated with the user that purchased the ticket for the winning seat and not from someone else. There are many examples of someone not being in the right seat, due to user error, or simply someone picking a different seat than one in which they hold a ticket. In other, more sinister instances, a tag (16*a*) could be imitated, such as a photo or recreation of the tag (16*a*), for someone seeking to obtain the rights and privileges to that tag (16*a*), without actually having the rights to that tag at the given moment or event, i.e., you must actually have owned that ticket for that seat.

Thus, the ability to identify and confirm the right to sit in a particular seat, i.e., the user actually has the ticket for the seat in question, may have value to both the venue (202) and the user who holds the ticket for the particular seat. In the past, holding a paper ticket/ticket stub for a given seat, confirmed that that the user was at the game and sat at a particular seat. Today, many users opt for digital tickets, which may require an alternative to confirming that the user of the device (14*a*) also holds the ticket for the winning seat.

In a further example, a given seat or section within a venue may comprise the pre-loaded wagering wallet, reduced juice, improved lines, free point buys, etc., better payout odds on micro betting, or other wagering benefits. For the present example, the right to be in the particular seat and to have the right to scan that tag (16*a*) for that seat is limited to the person holding the ticket to that seat. What is not known is whether the person scanning that tag (16*a*) has the right to be in that seat. As such, the wagering validation (704) may utilize some or all of a seat verification method, such as method (900). Method (900), in this example, is being used to verify that a user holds the ticket for seat 1, row A, section 100 so the user can claim the benefit related to sitting in the particular seat or section. It should be noted that method (900), may be called in response to scanning a tag (16*a*) on the seatback (208) in front of the user or in response to selecting an option (220) from the fan portal (218). Thus, some or all of the method (900) may be incorporated into method (400) when the confirmation module (605) confirms place, time, and grouping (FIG. 4, steps [414, 418, 422]), method (900) may be invoked thereafter as a separate method, or some steps of method (900) may be called on during method (400) and other steps of method (900) may be called on after method (400). In other words, the wagering validation (704) may call on one or more steps for seat verification (method 900) when the wagering validation (704) needs to use those steps.

The wagering validation component (704 from FIG. 7) includes checking the seat at (710). Referring to FIG. 9, the method (900), details how the seat (710 from FIG. 7) is verified by determining if the user device (14*a*) that scanned the tag (16*a*) and is seeking to validate the right to the seat on which tag was located holds a valid ticket for the seat. First, the system determines whether the user device contains a unique identifying ticket code which provides information about the seat associated with the unique identifying ticket code (i.e., section, row, seat) (step 902). For example, returning to FIG. 7, the wagering validation component (704) may look to the digital wallet (24*a*), or any other local storage, contained on the user device (14*a*) that scanned the tag (16*a*) to locate a unique identifying ticket code. In this example, the system checks the user device and locates the unique identifying ticket code associated with seat 1, row A, section 100. In some instances, the redirect/identification server (302), socket server (324), or similar such server, may call back to the user device (14*a*), to see if the unique identifying ticket code is present. Where a unique identifying ticket code is found (yes), the specific ticket data contained therein (i.e., section, row, seat) can be used by the wagering validation component (704 from FIG. 7) to determine if the seat encoded to the unique identifying ticket code matches the seat encoded to the tag ID for the tag (16*a*) scanned by the user device. Thus, the wagering validation component (704 from FIG. 7) knows which user device (14*a*), via the unique ID contained in the manifest on the user device, is being used at a particular seat. In order to verify that the user who scanned the tag on seat 1, row A, section 100, holds a ticket for seat 1, row A, section 100, the system checks to see if the seat encoded to the unique identifying ticket code matches the seat associated with the tag ID (i.e., if both the unique identifying ticket code and the tag ID are for seat 1, row A, section 100, step [904]), then the wagering validation component (704 from FIG. 7) may verify the user's right to the seat (step 906). Once verified (step 906), the wagering module (714 from FIG. 7) may be enabled.

If, however, a unique identifying ticket code was not found on user device (14*a*) (step 902, no) or if the seat encoded to the unique identifying ticket code does not match with seat encoded to the tag ID, (step 904, no) then the wagering validation component (704 from FIG. 7) may look elsewhere to try to verify that the correct user is sitting in the correct seat. As one non-limiting example, the wagering validation component (704 from FIG. 7) may use a third-party integration (320) to make an API call to a third-party ticket seller, in-venue ticket seller, or the like, to try to verify that the user device (14*a*) used to scan the tag (16*a*) associated with seat 1, row A, section 100, is the seat in which the person using the device (14*a*) is entitled to sit. For example, the ticket seller may obtain certain personal identifying information when a ticket is bought. Such information may include, but is not limited to name, address, phone number, credit card information, or another set of data that may be used to determine if the user device (14*a*) that scanned the tag (16*a*) has the particular right to the given seat during the event in progress, such is included in a digital record. Thus, the API (or other) call may provide a second source of digital data (digital record) separate and apart from the unique identifying ticket code (910) that may or may not match (step 912) the tag ID data and/or unique ID data. An example where seats may not match at step (904), but data may match at (912) is where the user of the device (14*a*) purchased several seats at the same time, such as where a family purchased five tickets for the game. In reality, the same user may have purchased all of the tickets, but the unique identifying ticket code on user device (14*a*) is for the next seat over, or that particular device (14*a*) does not have any unique identifying ticket code stored thereon. Either way, data from the ticket seller may confirm (step 912, yes) that user holding user device (14*a*), is indeed entitled to make a request to verify the seat ownership to confer/verify (step 906) the wagering benefits afforded to the seat or section. Alternatively, digital record/data may be obtained from user information, such as an email, credit card, phone number, address, or other data related to the purchase of that seat. Nevertheless, if such data is absent or proves deficient (step 912, no), then a determination may be made to see if a paper ticket (step 914) is available to allow seat verification via the wagering validation (704).

If a paper ticket is produced (914) and the seat on the paper ticket matches the seat associated with the tag ID (i.e., seat 1, row A, section 100) (step 916, yes) then the wagering validation (704) may verify the seat (step 906). For example, paper tickets frequently have a code or other information printed thereon that can be scanned to verify the information on the ticket for this purpose. If no (step 916, no), then seat verification is denied (step 908).

Returning back to step (914), if the user does not have a paper ticket (step 914, no) then the user may request verification via an entity, other than previously consulted, that may have provided the ticket (step 918). Such an example may be that the user bought the ticket from a friend and did not transfer the electronic file related to the ticket. A simple text or email to the friend may allow the user to get the necessary information (step 918) and, if upon re-running the process the requisite data matches (step 918, yes) the seat is verified (step 906). Otherwise, seat verification is denied (step 908).

In each of the processes that may be utilized by the wagering validation (704), user device (14*a*) approval with respect to a particular tag (16*a*), hence seat, is an initial, gatekeeper function, which may be simple or complex depending upon the certainty desired under the circumstances.

Figure 10:
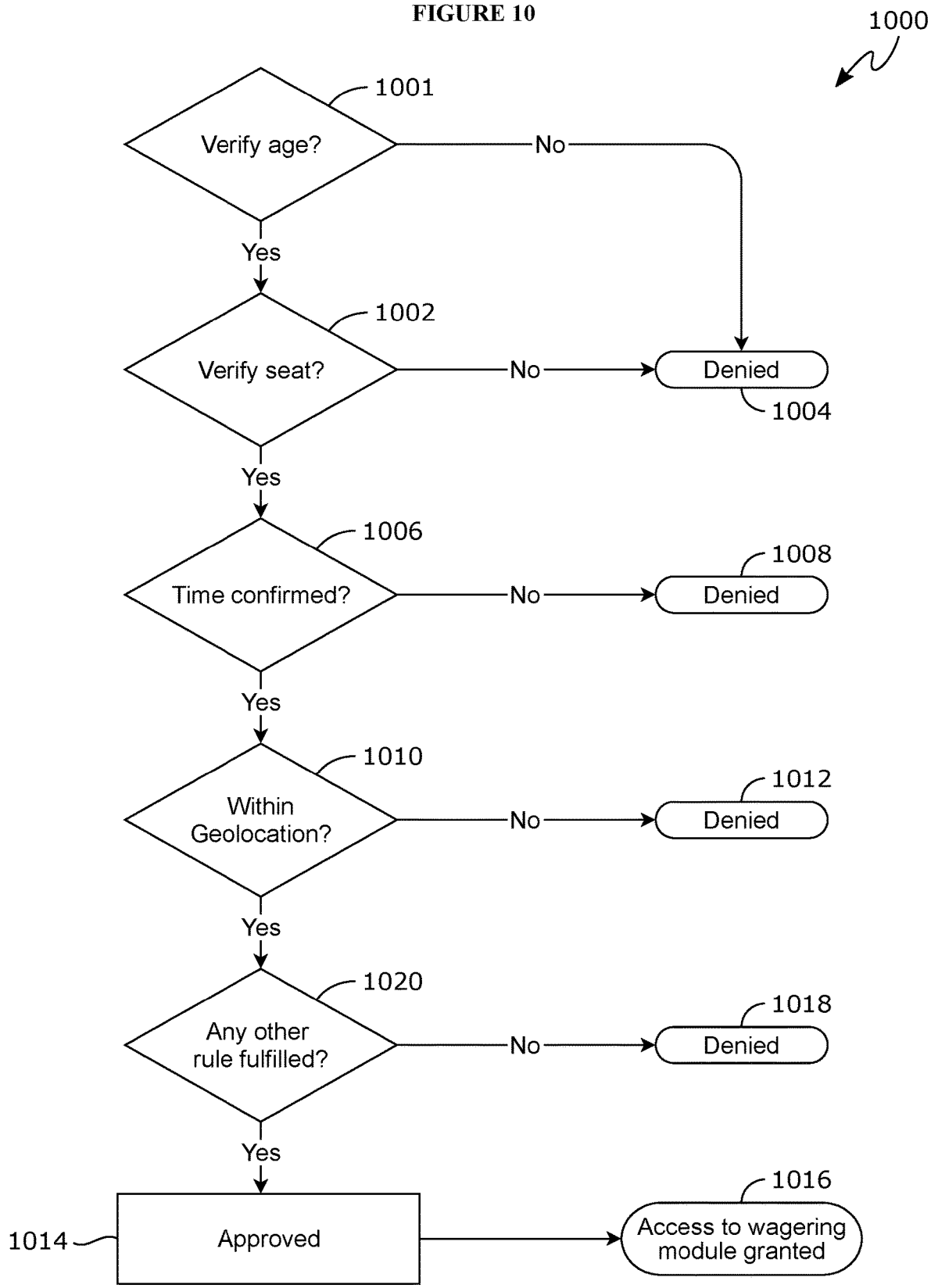
FIG. 10 depicts a flowchart of an embodiment of the system for access to a wagering module by scanning a digital tag.

Referring to FIG. 10, an embodiment is shown where at least four distinct levels of confirmation above the basic level of confirmation (e.g., method [400]) must be achieved before the requirements of the wagering validation (704) are satisfied, such as when granting a particular user the ability to receive a particular benefit within the wagering validation (704). As with method (900), various steps of method (1000) may be utilized by the wagering validation (704) as required by specific circumstances. Furthermore, entry into method (1000) may be immediately after scanning a tag (16*a*, 16*b*) or after selecting an option (220) on the fan portal (218). Thus, method (1000) may begin with a determination of the age of the user (1001), by determining from the unique ID or from a third-party API, or a manual input, such a scanning of a government identification card, to verify the age of the user. If age is verified, then the seat is next verified, otherwise, if no age is verified, or the age is below a minimum wagering age, then the user is denied (1004). Then, the system determines whether the seat can be verified as described with respect to FIG. 9. Seat verification per method (1000) may implement some or all of the seat verification steps of method (900). If the seat cannot be verified (step 1002, no), the requesting user device (14*a*) is denied (step 1004) access to the wagering module.

If user device (14*a*) passes the seat verification step (1002, yes), then any time requirements (1006) may be confirmed. Generally, the wagering validation feature (605) may determine if the wagering portal is available at the moment when it checks the time requirements. For example, wagering may only be available during a set window for a given set of lines, or for special betting options, or based on some other local or federal rule, such as 10 minutes before the game is scheduled to begin, as one non-limiting example. To make such determination, the time (318) from an official time keeping element, as is known in the art, may be consulted, and compared to the time set for the wagering platform. If the time is confirmed, i.e., the request for the wagering platform while window is open (step 1006, yes), the method (1000) may progress to a geolocation check. If not (step 1006, no) then the user device (14*a*, 14*b*) is denied (step 1008) to access the wagering platform.

In an embodiment, geolocation determination is made via consulting the geofence (316), as was described with respect to method (800). That is, some or all of the steps associated with method (800) may be utilized by the wagering validation feature (605) to verify geolocation. If user device is outside the prescribed geofence/geolocation (step 1010, no), then the user device (14*a*) is denied (step 1012) the ability to legally wager in that given location. If, however, the user device (14*a*) is within the geofence/geolocation (step 1010, yes), then the user device (14*a*) is approved by the wagering validation feature (605) and the wagering module is enabled (1016). Thus, FIG. 10 details how a proprietor, venue, event, or the like can limit the rights to when wagering can be accessed through several levels of verification, confirmation, and the like related to the scan of a single tag (16*a*).

Finally, the method determines if any other rules are required or fulfilled (2020). In a non-limiting embodiment, the particular wager is linked to an offer for $100 of free play, if the user has previously loaded at least $100 on the platform. Thus, as detailed in FIG. 7 and also in FIG. 11 below, the action of loading money into a wagering wallet may be a rule to authorize the special offer. If the $100 has been previously loaded, then the rule at (1020) is yes, and thus approved (1014) to receive the special redirect to obtain the $100 in free play. If the rule is not met (1020, no), then the user is denied 1018 the $100 free bet. It may be possible for the user to then load the $100, see FIG. 7 or FIG. 11, and then to reverify to receive the $100 free bet offer, and then proceed to the wagering module (1016).

Figure 11:
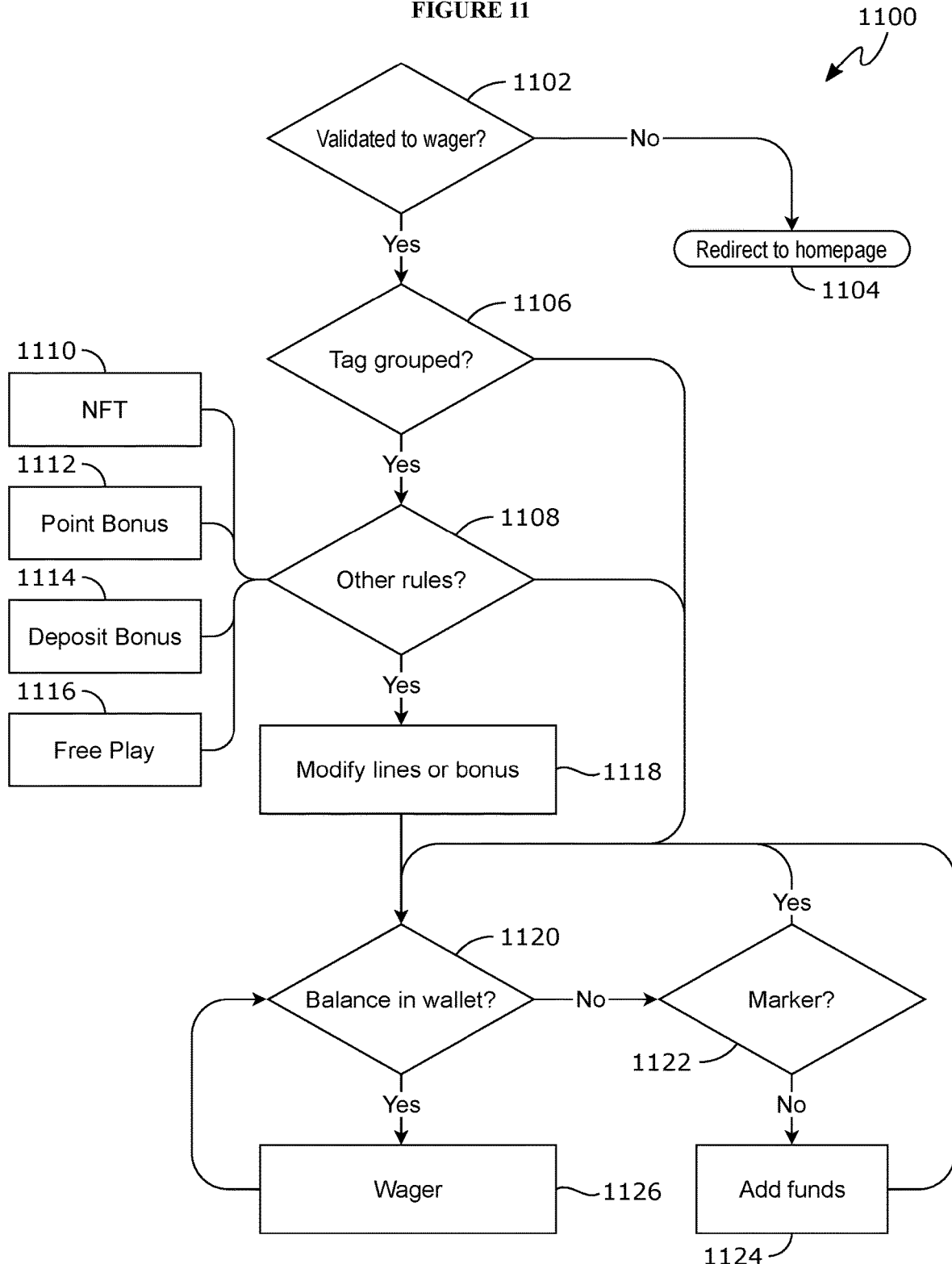
FIG. 11 depicts a flowchart of an embodiment of the system, which includes certain additional rules or bonuses to impact or modify the wagering or addition of funds through a wagering portal.

FIG. 11 provides an embodiment related to wagering on a system, and particularly defines that certain inputs may be generated because of benefits earned by the user, benefits or promotions from the casino or a third-party, and flow of the process based on the need to have money in a digital wallet, wagering wallet or account to place a wager.

As provided in prior examples, a user must be validated to wager on the platform, including age, location, and/or other requirements. Thus, system (1100) begins by confirmation of validation to wager (1102), where a rejection or not validated redirects the user to a homepage (1104) or any other target URL established by the administrator or proprietor. However, if the user is validated (1102, yes) then a determination can be made as to whether the tag scanned has a particular tag grouping (1106), which may confer some benefit. Tag based benefits are provided where it may be advantageous to provide certain bonuses to users through the tag itself. In a non-limiting illustration, at a given venue, the wagering provider, for example a partner casino, decides to provide section 200 as a wagering specific section, thus each tag ID for section 200 is placed in the tag ID grouping for "wagering specific section". This illustration is a variation of the exemplary stadium depicted in FIG. 2. The tags (16*a*) may be mounted as shown in FIG. 2 or alternatively, the seatback (210) may contain a screen such as an LCD screen or any other screen generally known in the art, that displays an MRC and also acts as an interactive touch screen in the same way that a user device functions, or the seatback (210) may have both a tag and a screen. The user device (14*a*) can scan the tag (16*a*) or scan the screen to access the system. Once the user has entered the system, the user can interact with the system via the user device (14*a*), the screen or both. By sitting in this "wagering specific section," the seats provide a digital screen, provide free beverages and food, and reduce the juice on each bet by 10%. Tickets for section 200 are $250 USD and include a pre-loaded $200 within the wagering platform, upon conformation of the seat and the ticket by the given user. Thus, by scanning the tag (14*a*), the tag is grouped (1106), which generates at $200 USD credit into the wagering wallet (1120). If the user does not have a ticket for this section, the scan would show no grouping on this tag and can redirect to the step of checking for a wagering wallet balance (1120) or for other rules.

Where the tag is grouped, it may then determine what rules are relevant (1108). For example, as detailed herein, the tag may provide a point bonus or juice bonus (1112), thus a wager may cost −108, instead of −110 for typical bets within the system. Furthermore, there may be a deposit bonus (1114) provided, such that if the user deposits at least $100, or at least $500, or at least $N dollars, a 10%, 25%, 50%, 100%, 200%, etc. deposit bonus could be applied. As an example, if there is a 100% deposit bonus on a deposit of at last $500, then a deposit of $500 would yield $1000 into the wallet (1120). Further benefits might also include a free play (1116), which is a bet that costs nothing to the user but wining the bet will return some dollars.

Finally, it may be useful to have an NFT (1110) related to wagering. The NFT may function as a validation of certain rights held by the user, wherein the NFT was purchased, won at auction, given, or earned by the user. The NFT (1110), may through its own smart contract and data, confirm that when a tag is scanned, the NFT ownership is confirmed and then generates that bonus to the user. Nonlimiting examples may include a further deposit bonus, e.g., 110%, instead of a 100% deposit bonus, or grant a further reduction in juice on all bets, may return a portion of losses to the user, or may serve as a marker, providing access to some dollar amount, which must still be repaid, if lost. Finally, the NFT may also grant a daily or weekly or monthly free bet, or may simply give the user $100 or some other dollar amount each time they sit in section 200 at a given game. For example, the NFT may have been purchased for $1000 USD, and it confers a bonus of $100 to the user for 15 games. Once the 15× bonus is used (i.e., granting $1,500 in dollars to the user), then the NFT may no longer generate such financial bonus. However, these are non-limiting examples, and the rules and benefits of an NFT can be determined by each on a case-by-case basis.

After determining any of the various rules that may be applied to the given tag ID, or the given unique ID, the system is opened into the wagering portal, wherein the lines are modified or bonuses applied (1118) based upon said rules. Wagering is available to the extent that there is a balance in the wagering wallet (1120), which may also be understood to be the value of currency within the user's account. This can be defined by dollars, in cryptocurrency, another currency of another country, or in tokens that have a determined value on a given provider system. If there is a balance within the wagering wallet (1120, yes), then the user is able to place a wager on the system (1126), based upon any of the given lines or bets available at the given moment.

One of the benefits of the tag ID (14a) being utilized, is the implementation of the rules in the betting instances. The modification of the lines or bonuses (1118) can generate more favorable lines or bonuses to a better for participating through the system when at the venue, or when use of the system by betting at home, for example, by entering the system through a tag (14b) that is on a video screen. When a user accesses the wagering wallet (1120) and there is no balance, or insufficient balance or funds to make a particular bet, the balance must be increased. Casinos often use a marker, which is a predetermined line of credit that is given to the individual user based on their ability to repay these funds. This allows a user to not have to bring, for example, cash into a casino, but to instead be given a short-term loan of money. Typically, these markers have very short-term credit terms, sometimes as little as a few days, such that if the better loses, the amount must be repaid, through a bank transfer or other deposit. If no marker (1122) is available, the user can connect a bank account, or another third-party payment platform, to add funds (1124) into the wagering wallet (1120). This will then fund the account and allow the user to participate and wager in the system.

Therefore, the system being described, it is apparent to those of ordinary skill in the art that the system can be utilized to engage with customers and to engage with existing betting customers as well as entice and attract new betting customers. An individual, attending a venue, scans a tag (16a) at a given location with a user device (14a), the tag (16a) may possess certain benefits. Here, scanning a tag (16a), related to a particular section of the stadium, can generate a marker based on the tag (16a) as well as the unique ID (22a) associated with the user device (14a), so as to provide the appropriate level of marker based on metrics in the database related to the unique ID. The house may, at its discretion provide the marker and a bonus or modify the marker. For an example, in a given seat, corresponding to a particular tag, usually has a marker of $1,000 USD. The marker may then be provided for $1,000 and the amount provided to the player. The house may also provide certain bonuses to the player for taking the $1,000 marker. Many sports books and other online casinos provide certain bonuses to a player, such as a 10%, 20%, 30%, 50%, 100% bonus. Thus, a $1,000 marker may also include any additional dollar amount as a bonus. The particular bonus may be dependent on certain factors.

For example, a bonus may only be available by scanning the tag at a given moment or accessing from a particular aspect of the system. Alternatively, the bonus may be generated based on scanning a tag at a particular location within a venue. For example, a prize may be awarded from a free to play game within the venue, wherein scanning a particular tag wins the free game. And that win may provide certain bonuses to a player then funding their wagering account, whether through a marker or a deposit.

Another bonus could be applied by the first x number of users to fund an account, via a marker or deposit, at a venue on a given day. Thus, the venue holds 100,000 people, and the first 100 to fund their accounts at a given event get a 50% deposit bonus. Certain further limitations may be present, for example, has the user previously wagered within the venue (a new or returning account), is the tag or user within a certain section of a venue, such as a VIP section, or a higher price or lower price section that has some benefit.

Therefore, certain benefits may be available based on a given seat or the given purchase of a ticket to the event. Thus, as detailed above, a scan of a tag (16a) may confirm the identity of the user, as well as the value paid for the given ticket and then whether the ticket is authorized at the given seat location. Certain seats or tickets can be pre-sold with a given value or a given marker attached to them. For example, in Section 101, seats in Rows 1-5 are priced at $1000 a seat, but each seat comes with a $1000 value within the wagering platform. By comparison, Section 102, seats in rows 1-5 are priced at $500 a seat and come with a $500 value within the wagering platform. Thus, the venue can pre-sell and pre-load value within the wagering platform at any amount above or below the face value of the seat being offered. Furthermore, the venue or casino can then provide additional bonuses to these seat users, including deposit bonuses, bonuses for a deposit, whether to initially fund more money within the platform, or if and when a player is zeroed, to re-deposit money. This provides the casino or the provider and instant opportunity to test seat preferences, gaming preferences, and bonuses to entice users to wager on the system or to attract new players into their wagering platform. This provides a new mechanism to acquire new players in a market that typically has a high cost per new client acquisition price.

In other embodiments, micro betting may be desirable and provide fun entertainment for those users wishing to participate in a continuous set of wagers on a given game. In certain embodiments, the platform is set up for micro betting. Micro betting is similar to a prop bet, where a player is wagering on individual moments in a game that are not related to the final score. The wager occurs in real-time, which is how it ties to in-play betting. The big difference in micro betting as compared to prop betting is that when compared to live betting, this bet type will settle much faster. The user placing the bet does not need to wait until the game has concluded, or even if a single quarter of the game has concluded, to know if the user has won the bet.

For example, a particular micro betting line would allow for a user at a baseball game to wager on specific innings or even half-innings, individual pitches, or individual at bat batting results. Thus, the micro bet could be, will there be a ball or a strike on the next pitch, will the batter get a hit on the next pitch or in this at bat? Will the hit be a single or double, or perhaps a home run? Will the batter walk on 4, 5, 6, 7 pitches? Will there be more than 7 pitches in the at bat?

Will there be a balk, a stolen base, etc. These single occurrences can be bet on quickly, and the outcome occurs in just seconds or minutes, depending on the exact bet. With the launch of new sites and apps, sportsbooks can use unique technology to push data in real-time. Indeed, a benefit of the micro betting is that odds are provided quickly, and bets can be placed as soon as the odds are posted or change.

The system herein is particularly suited to provide these rapid micro betting options, as the system can push new lines and options with maintaining a continuous connection to a user device (14a) through a Web app, among other options. By previously authenticating the user and providing such access, any number of users can take a user device (14a) scan a tag (16a) and participate in this type of wagering. The host casino can further entice such action by providing in venue benefits, such as $5 free, or first bet free, to allow players to begin playing on such micro betting, with the goal of attracting new customers.

One key feature is the ability of the house to modify lines based on in-venue action. For example, while the same bets are available at a normal casino, by confirming a geofence within the stadium, a preferred line may be applied, that reduces the juice on each bet or increases payouts, among other options.

Another action that may be enticing is use of live moving lines based on individual bets within the stadium. A given example is, who will win the game, and all bets must be played before the first pitch of a baseball game. Scanning a tag (16a) within the venue can populate this "key bet" for all users. The jumbo screen can identify, for example, the number of bets placed on each side, the total wagered on each side, the total at risk (amount to be paid out on a win) for each side of the bet, etc. The casino can then continuously move lines (and/or) set limits for total value of a bet placed on any given side. Thus, if Team A and Team B are playing, and Team A is heavily favored, and also has more money placed on Team A to win, the lines may be moved and showed on the jumbotron to attract money on Team B. Moving lines based on play, current prop bet, etc. I.e., who will score more points this quarter—bet starts at even money 110:110—moves as the line moves, get in early to get best line, or get in late to bet bigger on the underdog, etc. This helps the house to manage risk and move lines to ensure that the total risk is as even as possible (the house always wants the payout to be even, to minimize risk, so it earns the juice, but does not risk an overall loss.

Those of ordinary skill in the art will recognize that the systems and methods provided herein detail an exemplary system, which can be modified or used in whole in part across the various examples. Such systems enable a new and unique betting platform and access to the betting platform and wagering to entice new users and to engage with seasoned gamblers alike.

Referring back to FIG. 3, the infrastructure detailed therein is exemplary, dividing processing between at least two servers (e.g., redirect/identification server [302] and interface server [306]), but embodiments are not so limited. The numbers and types of servers and software may be scaled up, down, and distributed according to platform (20) demands/needs. Furthermore, more than one virtual machine may run on a single computer and a computer/virtual machine may run more than one type of server software (e.g., the software that performs a service, e.g., Web service, application service, and the like). Thus, in some instances platform (20) may include one computer for all processing demands, and in other instances platform (20) may include several, hundreds, or even more computers to meet processing demands. Additionally, hardware, software, and firmware may be included in or removed from platform (20) to increase functionality, storage, and the like as needed/desired.

Administrator device (12), which is shown in FIG. 1, may be any type of computer such as a laptop computer, desktop computer, tablet, and the like. Similarly, user device (14a or 14b) may be any type of processing device such as a handheld computer (e.g., phone, smartphone, tablet, personal digital assistant), wearable computer (e.g., watch, glasses), or portable computers (e.g., laptop, netbooks). Scanning of the tag (16a, 16b) from the user device (14a or 14b) is performed through near-field communication (NFC) or use of a camera on the user device (14a or 14b) to scan the visible quick response code (QR code). Administrator device (12) and user devices (14a or 14b) typically include a browser application to facilitate communications with one or more servers among other things.

Computer (12), user devices (14a, 14b), and servers (e.g., 302, 306, 310, 312, 320, 322, and 324) may each be a general-purpose computer. Thus, each computer includes the appropriate hardware, firmware, and software to enable the computer to function as intended and as needed to implement features detailed herein. For example, a general-purpose computer may include, without limitation, a chipset, processor, memory, storage, graphics subsystem, and applications. The chipset may provide communication among the processor, memory, storage, graphics subsystem, and applications. The processor may be any processing unit, processor, or instruction set computers or processors as is known in the art. For example, the processor may be an instruction set based computer or processor (e.g., x86 instruction set compatible processor), dual/multicore processors, dual/multicore mobile processors, or any other microprocessing or central processing unit (CPU). Likewise, the memory may be any suitable memory device such as Random Access Memory (RAM), Dynamic Random-Access memory (DRAM), or Static RAM (SRAM), without limitation. The processor together with at least the memory may implement system and application software including instructions, including methods, disclosed herein. Examples of suitable storage includes magnetic disk drives, optical disk drives, tape drives, an internal storage device, an attached storage device, flash memory, hard drives, and/or solid-state drives (SSD), although embodiments are not so limited.

In an embodiment, servers (e.g., 302, 306, 310, 312, 320, 322, an/or 324) may include database server functionality to manage database (308) or another database. Although not shown, infrastructure variations may allow for database (308) to have a dedicated database server machine. Database (308) and any other database may be any suitable database such as hierarchical, network, relational, object-oriented, multimodal, nonrelational, self-driving, intelligent, and/or cloud based to name a few examples. Although a single database (308) is shown in FIG. 3, in embodiments database (308) may comprise more than one database, the more than one database may be distributed across many locations, and data may be redundantly recorded in the more than one database. Furthermore, data may be stored in blocks that are part of a chronological blockchain (314) and may be dispersed across a decentralized distributed ledger. Blocks of data in a blockchain are linked in such a way that tampering with one block breaks the chain. Thus, digital data stored in a blockchain is verifiable with an elevated level of integrity. Therefore, the database (308) may also be a distributed database system, utilizing blockchain (e.g., 314) to provide for storage of NFTs or the like related to the system. As with any distributed database, the number of databases and particular nature of the blockchain storage is dependent on the particular exchange or blockchain utilized for the NFT as one non-limiting example. The use of a distributed database system is well known and the storage of an NFT or the like requires the use of such systems. Geofence (316) and Time (318) may be software services provided by the platform (20). These services (316, 318) may be executed by any or all of the computing machines, virtual or otherwise, found on the platform (20). These services may use data from one or more user devices (14*a*, 14*b*) and other data sources to provide their intended functionality as is known in the art.

It will be appreciated that the embodiments and illustrations described herein are provided by way of example, and that the present invention is not limited to what has been particularly disclosed. Rather, the scope of the present invention includes both combinations and sub combinations of the various features described above, as well as variations and modifications thereof that would occur to persons skilled in the art upon reading the forgoing description and that are not disclosed in the prior art. Therefore, the various systems and methods may include one or all of the limitations of an embodiment, be performed in any order, or may combine limitations from different embodiments, as would be understood by those implementing the various methods and systems detailed herein.

What is claimed is:

1. A method for contactless communications that allow wagering within a venue using an encoded tag comprising:
   a. in response to receiving a request from a user device that has scanned an encoded tag positioned on a seat and comprising a tag ID identifying said seat, obtaining data associated with said tag ID from a database;
   b. verifying a unique ID received from said user device by sending a request for a matching unique ID from a server to said database or generating a unique ID if one is not present on said user device;
   c. verifying an identity and age of a user corresponding to the unique ID using information from said user device, said database, a third party integration, or combinations thereof;
   d. verifying limited ownership of the seat defined by said tag ID by comparing the seat defined by said tag ID to seat information from said user device, said database, said third party integration, or combinations thereof to determine if there is a match;
   e. in response to determining that there is a match, redirecting the user device to a target URL defining a wagering portal;
   f. accessing, from a wallet, funds for placing a wager;
   g. using said funds for placing a wager; and
   h. in response to scanning a digital tag displayed on a jumbo screen, receiving a request from the first x number of user devices that scan said digital tag for a free bet, the requests received in response to scanning said digital tag without a requirement for seat verification.

2. The method of claim 1 further comprising a verification step selected from the group consisting of: a time verification, a geolocation verification, a predetermined threshold defined by an administrator, and combinations thereof.

3. The method of claim 1 wherein the step of verifying limited ownership of the seat defined by said tag ID is performed wherein upon scanning in step (a) of the tag, a server confirms the presence of a unique identifying ticket code corresponding to the seat defined by the tag ID.

4. The method of claim 1 wherein the step of verifying limited ownership of the seat defined by said tag ID is performed by utilizing an API call to match a digital record on the user device to an authorization for the ticket at the given tag, wherein the digital record is selected from the group consisting of: a digital ticket, a phone number, a credit card, an address, a name, a birthday, another personally identifiable information, and combinations thereof.

5. The method of claim 1 further comprising:
   d2 determining that the user device is within a predetermined geofence.

6. The method of claim 1 further comprising:
   d2 confirming the presence of a first scan of a tag corresponding to a tag ID and performing a second scan of the same tag on a different day than the first scan.

7. The method of claim 1 further comprising determining that the tag is present at said venue wherein an event is being held at the time of the user scan.

8. A method for contactless communications that allow wagering within a venue using an encoded tag comprising:
   a. in response to receiving a request from a user device that has scanned an encoded tag comprising a tag ID identifying a seat on which the encoded tag is positioned, the encoded tag also being grouped within a section that provides a free bet upon scanning the encoded tag, obtaining data associated with said tag ID from a database;
   b. verifying a unique ID received from said user device by sending a request for a matching unique ID from a server to said database or generating a unique ID if one is not present on said user device;
   c. verifying an identity and age of a user corresponding to the unique ID using information from said user device, said database, a third party integration, or combinations thereof;
   d. verifying limited ownership of the seat defined by said tag ID by comparing the seat defined by said tag ID to seat information from said user device, said database, said third party integration, or combinations thereof to determine if there is a match;
   e. in response to determining that there is a match, redirecting the user device to a target URL defining a wagering portal;
   f. accessing, from a wallet, funds for placing a wager; and
   g. using said funds for placing a wager.

9. The method of claim 8 further comprising using the unique ID to collect data via the user device while the user is engaged with the wagering portal and to store the collected data in a database and in association with the unique ID.

* * * * *